United States Patent
Sugiyama et al.

(10) Patent No.: US 9,303,653 B2
(45) Date of Patent: Apr. 5, 2016

(54) DYNAMIC PRESSURE BEARING APPARATUS AND FAN

(71) Applicant: NIDEC CORPORATION, Kyoto (JP)

(72) Inventors: Tomotsugu Sugiyama, Kyoto (JP); Teiichi Hirono, Kyoto (JP); Shinichiro Noda, Kyoto (JP); Akihiro Kimura, Kyoto (JP); Yoshiharu Ikegami, Kyoto (JP); Tomohiro Hasegawa, Kyoto (JP); Masafumi Fujimoto, Kyoto (JP); Tomohiro Yoneda, Kyoto (JP)

(73) Assignee: NIDEC CORPORATION, Kyoto-shi (JP)

(*) Notice: Subject to any disclaimer, the term of this patent is extended or adjusted under 35 U.S.C. 154(b) by 0 days.

(21) Appl. No.: 14/513,612

(22) Filed: Oct. 14, 2014

(65) Prior Publication Data
US 2015/0030481 A1 Jan. 29, 2015

Related U.S. Application Data

(62) Division of application No. 13/523,478, filed on Jun. 14, 2012.

(30) Foreign Application Priority Data

Jun. 30, 2011 (JP) .................. 2011-146392
Aug. 19, 2011 (JP) .................. 2011-179970
Apr. 27, 2012 (JP) .................. 2012-102725

(51) Int. Cl.
*F16C 32/06* (2006.01)
*F04D 29/057* (2006.01)
*F16C 33/74* (2006.01)
(Continued)

(52) U.S. Cl.
CPC .............. *F04D 29/057* (2013.01); *F04D 25/06* (2013.01); *F04D 25/062* (2013.01); *F04D 25/0626* (2013.01); *F04D 29/0513* (2013.01); *F04D 29/063* (2013.01); *F04D 29/083* (2013.01); *F16C 17/107* (2013.01); *F16C 32/0633* (2013.01); *F16C 33/745* (2013.01); *F16C 2360/46* (2013.01)

(58) Field of Classification Search
CPC ........ F16C 17/02; F16C 17/026; F16C 17/10; F16C 17/102; F16C 17/107; F16C 33/72; F16C 33/723; F16C 33/726; F16C 33/74; F16C 33/741; F16C 33/743; F16C 33/745; F16C 32/0633; F16C 2360/46
See application file for complete search history.

(56) References Cited

U.S. PATENT DOCUMENTS 5,872,409 A 2/1999 Jung
5,994,803 A 11/1999 Jung
(Continued)

FOREIGN PATENT DOCUMENTS

CN 1957408 A 5/2007
CN 101160472 A 4/2008
(Continued)

*Primary Examiner* — James Pilkington
(74) *Attorney, Agent, or Firm* — Westerman, Hattori, Daniels & Adrian, LLP

(57) ABSTRACT

A dynamic pressure bearing apparatus includes a bearing portion; a shaft; a substantially annular bushing; a radial dynamic pressure bearing portion; and a seal gap. A minute horizontal gap extending radially is defined between an upper surface of the bearing portion and a lower surface of the bushing. The seal gap is arranged to be in communication with an exterior space through the horizontal gap.

4 Claims, 39 Drawing Sheets

(51) Int. Cl.
*F04D 29/063* (2006.01)
*F04D 29/08* (2006.01)
*F16C 17/10* (2006.01)
*F04D 25/06* (2006.01)
*F04D 29/051* (2006.01)

(56) References Cited

U.S. PATENT DOCUMENTS

| | | | |
|---|---|---|---|
| 6,074,098 | A | 6/2000 | Asai et al. |
| 6,252,322 | B1 | 6/2001 | Kawawada et al. |
| 6,672,767 | B2* | 1/2004 | Hajota et al. .............. 384/112 |
| 6,943,985 | B2 | 9/2005 | Kull et al. |
| 7,001,073 | B2* | 2/2006 | Hoffmann et al. .......... 384/107 |
| 8,064,166 | B2* | 11/2011 | Kainoh et al. ............. 384/112 |
| 2007/0024137 | A1 | 2/2007 | Otsuki et al. |
| 2007/0188034 | A1 | 8/2007 | Yoshida |
| 2007/0223848 | A1 | 9/2007 | Winterhalter |
| 2007/0286538 | A1 | 12/2007 | Mizutani |
| 2008/0007128 | A1 | 1/2008 | Murakami et al. |
| 2008/0211334 | A1* | 9/2008 | Tokuno et al. ............... 310/90 |
| 2008/0267793 | A1* | 10/2008 | Yang et al. .................. 417/354 |
| 2009/0129710 | A1 | 5/2009 | Ito et al. |
| 2009/0303473 | A1 | 12/2009 | Swiegers et al. |
| 2009/0324149 | A1 | 12/2009 | Yamamoto et al. |
| 2010/0277831 | A1* | 11/2010 | Efinger et al. .............. 384/110 |
| 2011/0007989 | A1 | 1/2011 | Nonaka et al. |
| 2011/0074230 | A1 | 3/2011 | Hasegawa et al. |
| 2011/0085751 | A1* | 4/2011 | Lin et al. ................... 384/215 |
| 2013/0004348 | A1 | 1/2013 | Sugiyama et al. |

FOREIGN PATENT DOCUMENTS

| | | |
|---|---|---|
| CN | 202971550 U | 6/2013 |
| JP | 2000-014080 A | 1/2000 |
| JP | 2000-32702 A | 1/2000 |
| JP | 2000-175405 A | 6/2000 |
| JP | 2001-56022 A | 2/2001 |
| JP | 2004-19669 A | 1/2004 |
| JP | 2004-248481 A | 9/2004 |
| JP | 2004-263710 A | 9/2004 |
| JP | 2005-195180 A | 7/2005 |
| JP | 2005-321089 A | 11/2005 |
| JP | 2011-146392 A | 1/2011 |
| JP | 2011-078224 A | 4/2011 |

* cited by examiner

DYNAMIC PRESSURE BEARING APPARATUS AND FAN

CROSS-REFERENCE TO RELATED APPLICATION

The application is a Divisional of U.S. patent application Ser. No. 13/523,478, filed on Jun. 14, 2012, which is based on Japanese priority application No. 2011-146392 filed on Jun. 30, 2011, 2011-179970 filed on Aug. 19, 2011 and 2012-102725 filed on Apr. 27, 2012, the entire contents of which are hereby incorporated by reference.

BACKGROUND OF THE INVENTION

1. Field of the Invention

The present invention relates to a dynamic pressure bearing apparatus installed in a motor.

2. Description of the Related Art

Ball bearings have been adopted as bearings in a variety of fans, such as axial fans and centrifugal fans. For example, ball bearings are adopted in a fan described in JP-A 2011-78224. Meanwhile, an oil-impregnated bearing obtained by sintering powder of a copper-based material is adopted in a fan described in JP-A 2000-14080.

A dynamic pressure bearing apparatus for use in a spindle motor of a disk drive apparatus is disclosed in JP-A 2005-321089. The dynamic pressure bearing apparatus includes a housing, a bearing sleeve, a shaft member, and a ring-shaped seal member. The bearing sleeve is fixed to the housing. The shaft member is arranged inside the bearing sleeve. The seal member is fixed to the shaft member on an upper side of the bearing sleeve. In the dynamic pressure bearing apparatus, a radial bearing portion is defined between an inner circumferential surface of the bearing sleeve and an outer circumferential surface of the shaft member. The shaft member is supported in a radial direction in a non-contact manner through the radial bearing portion. A first thrust bearing portion is defined between an upper end surface of the bearing sleeve and a lower end surface of the seal member. A second thrust bearing portion is defined between a lower end surface of the bearing sleeve and a flange portion provided at a lower end of the shaft member. The seal member and the flange portion are supported in a thrust direction in a non-contact manner through the first and second thrust bearing portions, respectively. A seal space is defined between an outer circumferential surface of the seal member and an inner circumferential surface of an upper end portion of the housing. A surface of a lubricating oil is kept always within a range of the seal space.

A spindle motor of a hard disk drive disclosed in JP-A 2000-175405 includes a hub having a rotor magnet attached thereto, and a base having stator coils attached thereto through a sleeve. An outer edge portion of the hub is arranged in proximity to the base, so that a labyrinth is defined between the hub and the base. Oil mist and the like generated in the spindle motor are thereby prevented from being dispersed, enabling the hard disk drive to achieve a high performance. A spindle motor disclosed in JP-A 2004-248481 includes a hub including a cylindrical projecting portion arranged to project downward. A labyrinth seal is defined by a combination of a clearance space between an upper surface of a bearing sleeve and a lower surface of a portion of the hub which is arranged radially inward of the projecting portion, a clearance space between an inner circumferential surface of the projecting portion and an outer circumferential surface of the bearing sleeve, and a clearance space between a lower surface of the projecting portion and a flange arranged around the bearing sleeve.

SUMMARY OF THE INVENTION

In recent years, electronic devices, such as servers, have improved in performance, and the amount of heat generated from the electronic devices has increased accordingly. There is therefore a demand for cooling fans in the electronic devices to be rotated at higher speeds in order to increase air volume. However, an increase in the rotation speed of the cooling fans leads to greater vibrations of the cooling fans, and this will affect other devices in the electronic devices. For example, vibrations of a cooling fan may cause an error in reading or writing by a disk drive apparatus.

A dynamic pressure bearing apparatus according to a preferred embodiment of the present invention includes a bearing portion; a shaft inserted in the bearing portion, and arranged to rotate about a central axis relative to the bearing portion; a substantially annular bushing fixed to the shaft on an upper side of the bearing portion, and arranged to allow an impeller to be attached to an outer circumferential surface thereof directly or through one or more members; a radial dynamic pressure bearing portion defined by an inner circumferential surface of the bearing portion, an outer circumferential surface of the shaft, and a portion of a lubricating oil which exists in a radial gap defined between the inner circumferential surface of the bearing portion and the outer circumferential surface of the shaft, and arranged to generate a fluid dynamic pressure in the portion of the lubricating oil; and a seal gap defined by the inner circumferential surface of the bearing portion and the outer circumferential surface of the shaft on an upper side of the radial dynamic pressure bearing portion, the seal gap including a seal portion having a surface of the lubricating oil defined therein. A minute horizontal gap extending radially is defined between an upper surface of the bearing portion and a lower surface of the bushing. The seal gap is arranged to be in communication with an exterior space through the horizontal gap.

A dynamic pressure bearing apparatus according to a preferred embodiment of the present invention includes a bearing portion; a shaft inserted in the bearing portion, and arranged to rotate about a central axis relative to the bearing portion; a substantially annular bushing fixed to the shaft on an upper side of the bearing portion, and arranged to allow an impeller to be attached to an outer circumferential surface thereof directly or through one or more members; a radial dynamic pressure bearing portion defined by an inner circumferential surface of the bearing portion, an outer circumferential surface of the shaft, and a portion of a lubricating oil which exists in a radial gap defined between the inner circumferential surface of the bearing portion and the outer circumferential surface of the shaft, and arranged to generate a fluid dynamic pressure in the portion of the lubricating oil; and a seal gap defined by the inner circumferential surface of the bearing portion and the outer circumferential surface of the shaft on an upper side of the radial dynamic pressure bearing portion, the seal gap including a seal portion having a surface of the lubricating oil defined therein. A horizontal gap extending radially is defined between an upper surface of the bearing portion and a lower surface of the bushing. A minute vertical gap extending in an axial direction and arranged in an annular shape centered on the central axis is defined between a circumferential surface of the bearing portion and a circumferential surface of the bushing. The vertical gap is connected with a radially outer end portion of the horizontal gap. The seal gap is arranged to be in communication with an exterior space through the horizontal gap and the vertical gap.

A dynamic pressure bearing apparatus according to a preferred embodiment of the present invention includes a bearing portion; a shaft inserted in the bearing portion, and arranged to rotate about a central axis relative to the bearing portion, an outer circumferential surface of the shaft including an attachment surface to which an impeller is to be attached directly or through one or more members; a radial dynamic pressure bearing portion defined by an inner circumferential surface of the bearing portion, the outer circumferential surface of the shaft, and a portion of a lubricating oil which exists in a radial gap defined between the inner circumferential surface of the bearing portion and the outer circumferential surface of the shaft, and arranged to generate a fluid dynamic pressure in the portion of the lubricating oil; a seal gap defined by the inner circumferential surface of the bearing portion and the outer circumferential surface of the shaft on an upper side of the radial dynamic pressure bearing portion, the seal gap including a seal portion having a surface of the lubricating oil defined therein; and an annular member arranged in an annular shape, fixed to the shaft axially between the seal portion and the attachment surface, and arranged to extend radially outward beyond an opening of the seal gap. A minute horizontal gap extending radially is defined between an upper surface of the bearing portion and a lower surface of the annular member. The seal gap is arranged to be in communication with an exterior space through the horizontal gap.

A dynamic pressure bearing apparatus according to a preferred embodiment of the present invention includes a bearing portion; a shaft inserted in the bearing portion, and arranged to rotate about a central axis relative to the bearing portion, an outer circumferential surface of the shaft including an attachment surface to which an impeller is to be attached directly or through one or more members; a radial dynamic pressure bearing portion defined by an inner circumferential surface of the bearing portion, the outer circumferential surface of the shaft, and a portion of a lubricating oil which exists in a radial gap defined between the inner circumferential surface of the bearing portion and the outer circumferential surface of the shaft, and arranged to generate a fluid dynamic pressure in the portion of the lubricating oil; a seal gap defined by the inner circumferential surface of the bearing portion and the outer circumferential surface of the shaft on an upper side of the radial dynamic pressure bearing portion, the seal gap including a seal portion having a surface of the lubricating oil defined therein; and an annular member arranged in an annular shape, and fixed to an upper portion of the bearing portion. A minute vertical gap extending in an axial direction is defined between the outer circumferential surface of the shaft and an inner circumferential surface of the annular member. A minimum radial width of the vertical gap is arranged to be smaller than a maximum radial width of an opening of the seal gap. The seal gap is arranged to be in communication with an exterior space through the vertical gap.

Preferred embodiments of the present invention provide dynamic pressure bearing apparatuses having structures suited to reduced vibration of fans.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a graph showing a result of a simulation of vibration that occurs in the fan.

FIG. 22 is a cross-sectional view illustrating a bearing mechanism according to yet another modification of the first preferred embodiment.

FIG. 32 is a cross-sectional view of a fan according to yet another modification of the first preferred embodiment.

FIG. 35 is a cross-sectional view of a fan according to yet another modification of the first preferred embodiment.

DETAILED DESCRIPTION OF THE PREFERRED EMBODIMENTS

Figure 1:
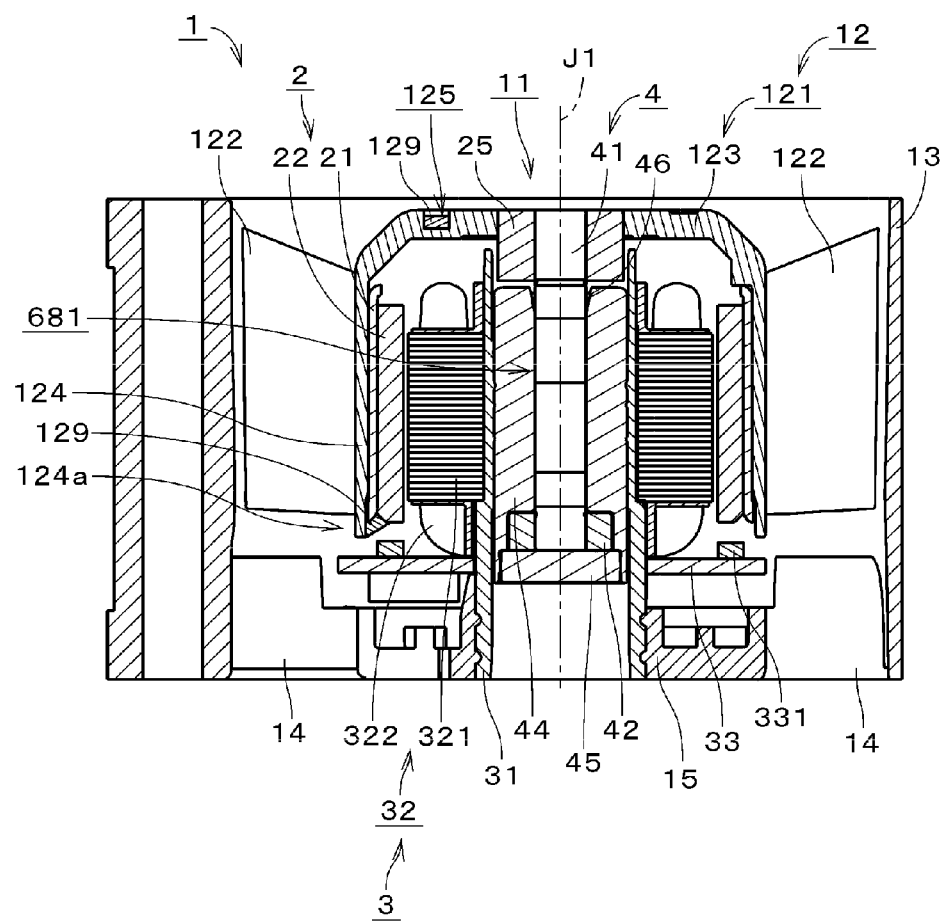
FIG. 1 is a cross-sectional view of a fan according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a cross-sectional view of an axial fan 1 according to a first preferred embodiment of the present invention. Hereinafter, the axial fan 1 will be referred to simply as the "fan 1". The fan 1 includes a motor 11, an impeller 12, a housing 13, a plurality of support ribs 14, and a base portion 15. The housing 13 is arranged to surround an outer circumference of the impeller 12. The housing 13 is joined to the base portion 15 through the support ribs 14. The support ribs 14 are arranged in a circumferential direction. The base portion 15 is defined integrally with the support ribs 14. The motor 11 is fixed on the base portion 15.

The impeller 12 is made of a resin, and includes a cup 121 and a plurality of blades 122. The cup 121 is arranged substantially in the shape of a covered cylinder. The cup 121 is arranged to cover an outside of the motor 11. The cup 121 is arranged to define a portion of a rotating portion 2 of the motor 11. The rotating portion 2 will be described below. The cup 121 includes a top face portion 123 and a side wall portion 124. The top face portion 123 is arranged to spread perpendicularly to a central axis J1. The side wall portion 124 is arranged to extend downward from an outer edge portion of the top face portion 123. The blades 122 are arranged to extend radially outward from an outer circumferential surface of the side wall portion 124 with the central axis J1 as a center. The cup 121 and the blades 122 are defined integrally with each other by a resin injection molding process.

A hole portion 125 is defined in an upper surface of the top face portion 123. A weight 129 is arranged in the hole portion 125. The weight 129 is an adhesive including a metal having a high specific gravity, such as tungsten. Another weight 129 is arranged on a lower end portion 124a of the side wall portion 124 on a radially inner side thereof. A reduction in unbalance of each of the impeller 12 and the rotating portion 2 of the motor 11 can be achieved by arranging the weight 129 on each of an upper portion and a lower portion of the impeller 12. Two-plane balance correction as described above achieves a reduction in vibrations of the fan 1 owing to a displacement of a center of gravity of any of the impeller 12 and the motor 11 from the central axis J1. Hereinafter, the hole portion 125 and the lower end portion 124a of the side wall portion 124, on each of which the weight 129 is arranged, will be referred to as "balance correction portions 125 and 124a", respectively.

The impeller 12 of the fan 1 is caused by the motor 11 to rotate about the central axis J1 to produce downward air currents.

The motor 11 is a three-phase outer-rotor motor. The motor 11 includes the rotating portion 2, a stationary portion 3, and a bearing mechanism 4. The rotating portion 2 includes a substantially cylindrical metallic yoke 21, a rotor magnet 22, and the cup 121. The yoke 21 is fixed to an inside of the cup 121. The rotor magnet 22 is fixed to an inner circumferential surface of the yoke 21. The bearing mechanism 4 is a dynamic pressure bearing apparatus arranged to generate a fluid dynamic pressure in a lubricating oil 46. The rotating portion 2 is supported through the bearing mechanism 4 to be rotatable about the central axis J1 with respect to the stationary portion 3.

The stationary portion 3 includes a substantially cylindrical bearing support portion 31, a stator 32, and a circuit board 33. A lower portion of the bearing support portion 31 is fixed to an inner circumferential surface of the base portion 15 which defines a central hole portion thereof. The stator 32 is fixed to an outer circumferential surface of the bearing support portion 31 on an upper side of the base portion 15. The stator 32 is arranged radially inside the rotor magnet 22. The stator 32 includes a stator core 321 and a plurality of coils 322 arranged on the stator core 321. The stator core 321 is defined by laminated steel sheets. The circuit board 33 is fixed below the stator 32. Lead wires from the coils 322 are attached to pins (not shown) inserted in holes of the circuit board 33, whereby the stator 32 and the circuit board 33 are electrically connected with each other. Note that the lead wires from the coils 322 may be directly connected to the circuit board 33. While the motor 11 is driven, a turning force is generated between the rotor magnet 22 and the stator 32.

An annular magnetic member 331 is arranged on an upper surface of the circuit board 33. The magnetic member 331 is arranged under the rotor magnet 22. While the motor 11 is stationary, a magnetic center of the stator 32 is located at a level lower than that of a magnetic center of the rotor magnet 22. In the fan 1, magnetic attraction forces that attract the rotor magnet 22 downward are generated between the rotor magnet 22 and the stator 32, and between the rotor magnet 22 and the magnetic member 331. A force that acts to lift the impeller 12 relative to the stationary portion 3 during rotation of the fan 1 is thereby reduced.

Figure 2:
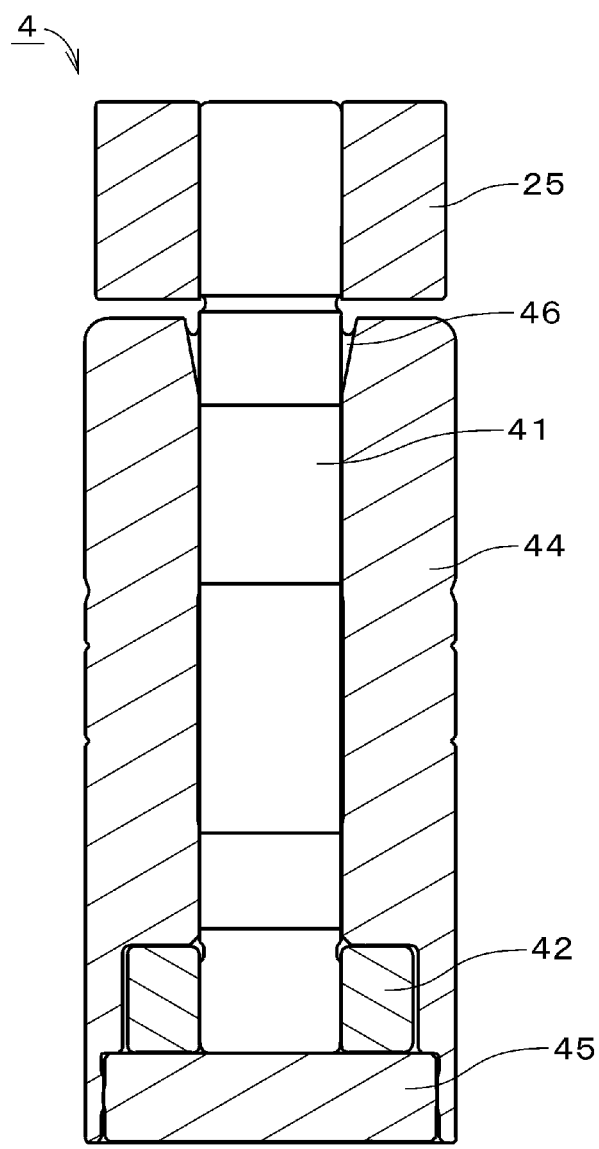
FIG. 2 is a cross-sectional view of a bearing mechanism according to the first preferred embodiment.

FIG. 2 is a cross-sectional view illustrating the bearing mechanism 4. The bearing mechanism 4 includes a shaft 41, an annular thrust plate 42, a bearing portion 44, a thrust cap 45, which corresponds to a cap member, a substantially annular bushing 25, and the lubricating oil 46. The bushing 25 is made of a metal. An inner circumferential surface of the bushing 25 is press fitted and thereby fixed to an upper portion of the shaft 41 on an upper side of the bearing portion 44. The bushing 25 is arranged to have an outside diameter smaller than that of the bearing portion 44. As illustrated in FIG. 1, the impeller 12 is fixed to an outer circumferential surface of the bushing 25. That is, the top face portion 123 of the impeller 12 is indirectly fixed to the upper portion of the shaft 41 through the bushing 25. The impeller 12 and the bushing 25 may be joined to each other by an insert molding process. In this case, the outside diameter of the bushing 25 is arranged to be greater than the outside diameter of the bearing portion 44. This makes it possible to mold the impeller 12 while at the same time fixing the impeller 12 to the bushing 25 by arranging the resin on the outer circumferential surface of the bushing 25 when the bearing mechanism 4 as illustrated in FIG. 2 is placed inside a mold, without a need to use a complicated mold. Because the impeller 12 is directly fixed to the bushing 25, the structure of the fan 1 can be simplified, and a reduction in a production cost of the fan 1 can be achieved. Moreover, since the bushing 25 is arranged, inside the mold, to be substantially concentric with the central axis with high precision, and the impeller 12 is molded around the bushing 25, concentricity of each of the impeller 12 and the bushing 25 with the central axis J1 is achieved with high accuracy. The thrust plate 42 is a thrust portion arranged axially opposite the bearing portion 44, and fixed to a lower portion of the shaft 41. The thrust plate 42 is arranged to extend radially outward from a lower end of the shaft 41. The bearing portion 44 is arranged radially inside the stator 32. Note that each of the shaft 41 and the thrust plate 42 defines a portion of the rotating portion 2, while each of the bearing portion 44 and the thrust cap 45 defines a portion of the stationary portion 3. The same is true of other preferred embodiments of the present invention described below.

Figure 3:
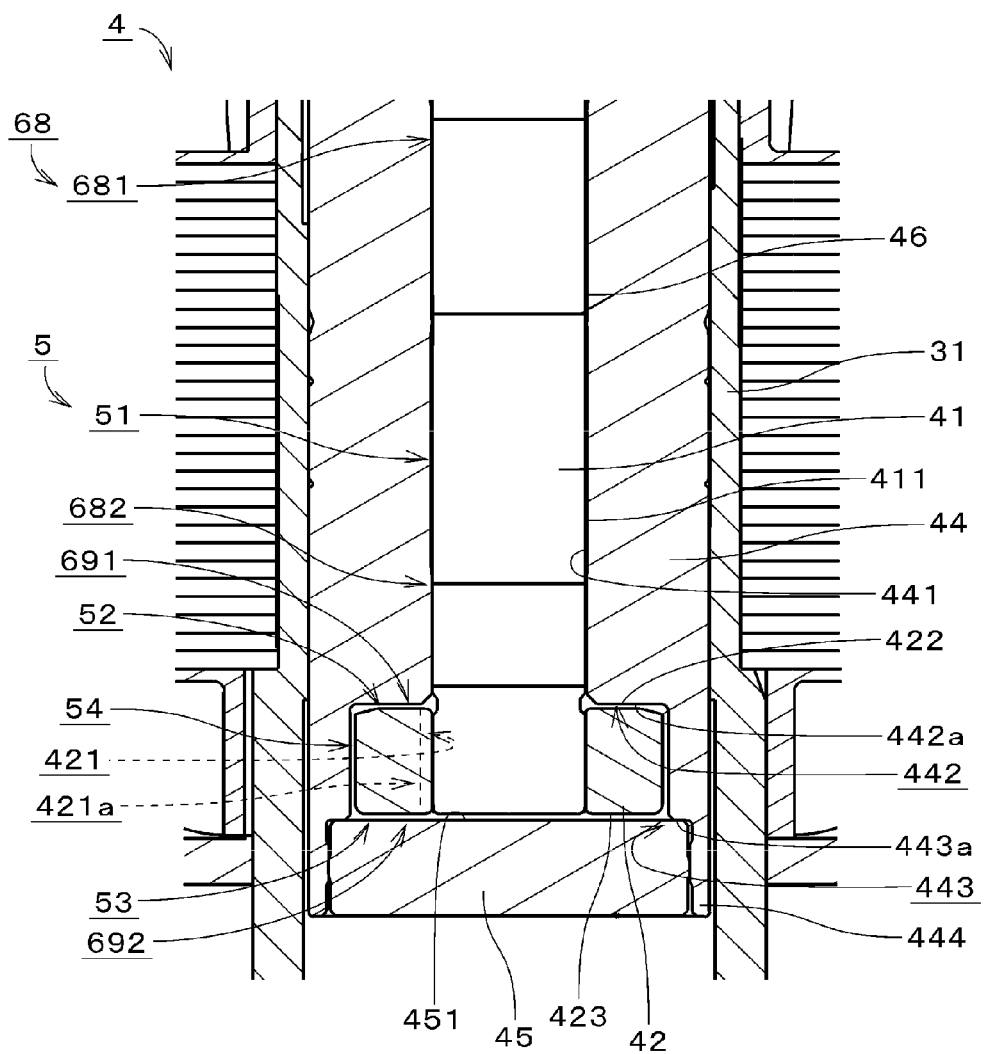
FIG. 3 is a cross-sectional view of the bearing mechanism.
Figure 4:
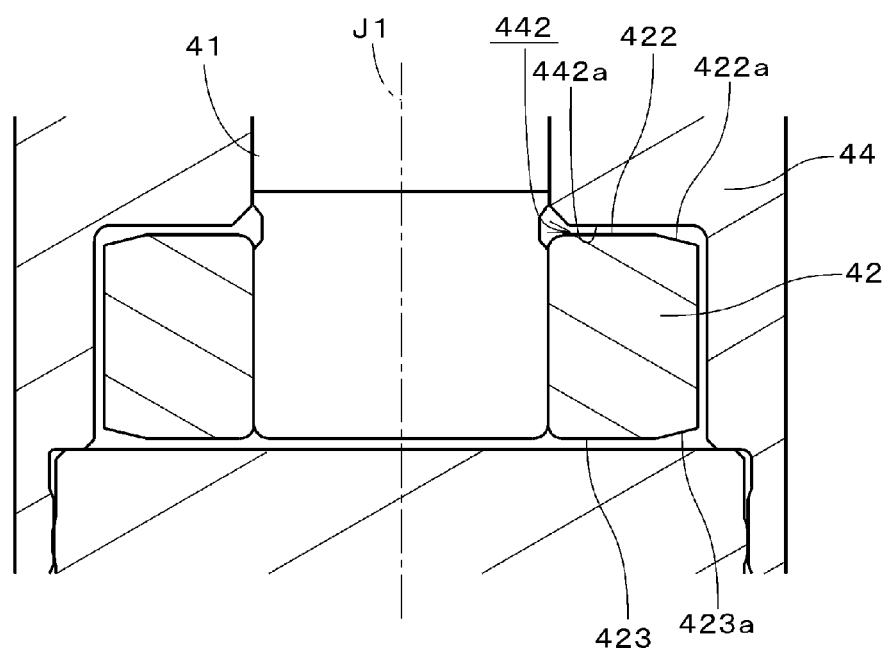
FIG. 4 is a cross-sectional view illustrating a portion of the bearing mechanism in an enlarged form.

FIG. 3 is a cross-sectional view of a lower portion of the bearing mechanism 4 and its vicinity in an enlarged form. An inner circumferential surface of the thrust plate 42 includes a groove portion 421 arranged to extend in an axial direction, and a communicating hole 421a is defined between the groove portion 421 and an outer circumferential surface 411 of the shaft 41. This contributes to reducing a difference in internal pressure of the lubricating oil 46 between an upper side and a lower side of the thrust plate 42. Referring to FIG. 4, an upper surface of the thrust plate 42 includes an inclined surface 422a defined in an outer edge portion thereof. The inclined surface 422a is arranged to be inclined downward with increasing distance from the central axis J1. A portion of the upper surface of the thrust plate 42 which is located radially inward of the inclined surface 422a is an annular surface perpendicular to the central axis J1 and arranged around the shaft 41. Hereinafter, this portion of the upper surface of the thrust plate 42 will be referred to as an "upper annular surface 422". An outer edge portion of a lower surface of the thrust plate 42 includes an inclined surface 423a arranged to be inclined upward with increasing distance from the central axis J1. A portion of the lower surface of the thrust plate 42 which is located radially inward of the inclined surface 423a is an annular surface perpendicular to the central axis J1. Hereinafter, this portion of the lower surface of the thrust plate 42 will be referred to as a "lower annular surface 423".

The bearing portion 44 illustrated in FIG. 3 is a single sleeve made of a metal, such as stainless steel or phosphor bronze. The bearing portion 44 is fixed to an inner circumferential surface of the bearing support portion 31. The shaft 41 is inserted in the bearing portion 44. The bearing portion 44 includes a first shoulder portion 442 defined by an increase in the diameter of an inner circumferential surface 441 of the bearing portion 44 in a lower portion of the inner circumferential surface 441, and a second shoulder portion 443 defined by an increase in the diameter of the inner circumferential surface 441 between the first shoulder portion 442 and a lower end portion 444 of the bearing portion 44. The thrust cap 45 is arranged inside of the lower end portion 444, and an outer circumferential surface of the thrust cap 45 is fixed to an inner circumferential surface of the lower end portion 444. The thrust cap 45 is arranged to close a bottom portion of the bearing portion 44 below the thrust plate 42. An outer edge portion of an upper surface 451 of the thrust cap 45 is arranged to be in axial contact with a lower surface 443a of the second shoulder portion 443. The thrust plate 42 is arranged between the first shoulder portion 442 and the second shoulder portion 443.

In the bearing mechanism 4, a radial gap 51 is defined between the inner circumferential surface 441 of the bearing portion 44 and the outer circumferential surface 411 of the shaft 41. A gap 52 is defined between the upper annular surface 422 of the thrust plate 42 and a lower surface 442a of the first shoulder portion 442, which is arranged axially opposite the upper annular surface 422. Hereinafter, the gap 52 will be referred to as a "first lower thrust gap 52". The lower annular surface 423 of the thrust plate 42 and the upper surface 451 of the thrust cap 45 are arranged axially opposite each other, and a gap 53 is defined between the lower annular surface 423 and the upper surface 451. Hereinafter, the gap 53 will be referred to as a "second lower thrust gap 53". The sum of the axial width of the first lower thrust gap 52 and the axial width of the second lower thrust gap 53 is arranged in the range of about 10 μm to about 40 μm. A gap 54 is defined between an outer circumferential surface of the thrust plate 42 and a portion of the inner circumferential surface 441 of the bearing portion 44 which is radially opposed to the outer circumferential surface of the thrust plate 42. Hereinafter, the gap 54 will be referred to as a "side gap 54".

Figure 5:
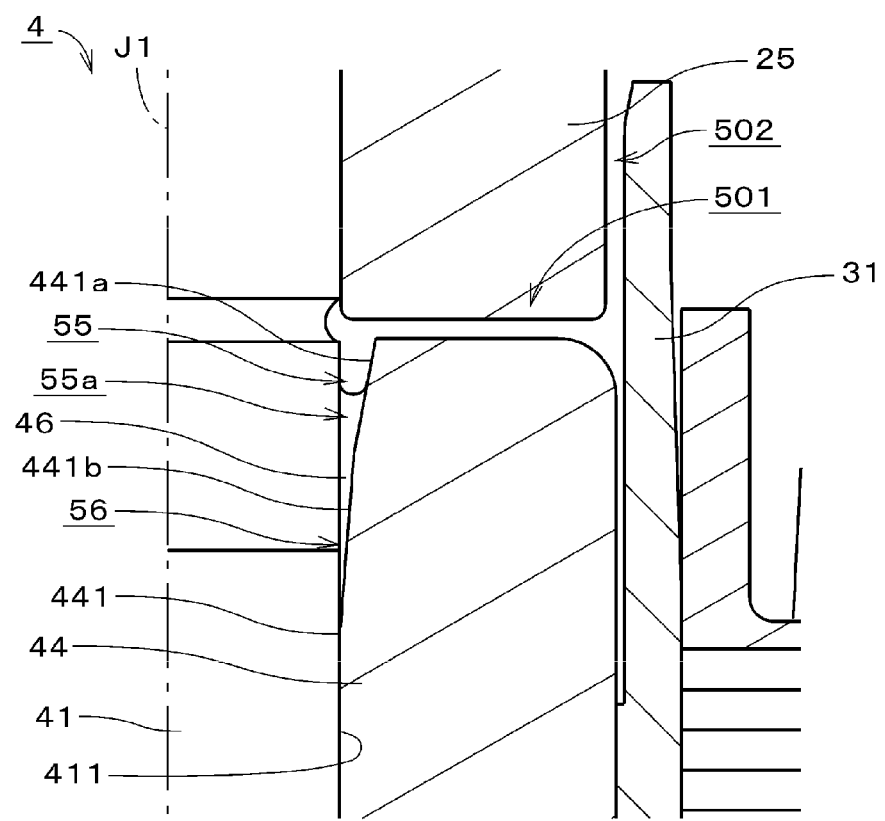
FIG. 5 is a cross-sectional view illustrating a portion of the bearing mechanism in an enlarged form.

FIG. 5 is a diagram illustrating an upper portion of the bearing portion 44 and its vicinity in an enlarged form. An upper portion of the inner circumferential surface 441 of the bearing portion 44 includes a first inclined surface 441a and a second inclined surface 441b. The first inclined surface 441a is arranged to extend radially inward and obliquely downward from an upper surface of the bearing portion 44. In other words, the diameter of the first inclined surface 441a is arranged to gradually increase with increasing height. The second inclined surface 441b is arranged to extend radially inward and obliquely downward from a lower end of the first inclined surface 441a. An angle defined by the first inclined surface 441a with the central axis J1 is arranged to be greater than an angle defined by the second inclined surface 441b with the central axis J1. A boundary between the first and second inclined surfaces 441a and 441b is arranged radially inward of a radial middle point between an upper end of the first inclined surface 441a and the outer circumferential surface 411 of the shaft 41.

The first inclined surface 441a and the outer circumferential surface 411 of the shaft 41 are arranged to together define a single seal gap 55 therebetween. The seal gap 55 is arranged to gradually increase in radial width with increasing height. The seal gap 55 is arranged in an annular shape centered on the central axis J1. A seal portion 55a arranged to retain the lubricating oil 46 through capillary action is defined in the seal gap 55. The seal gap 55 serves also as an oil buffer arranged to hold a large amount of the lubricating oil 46. In the motor 11, the seal gap 55, the radial gap 51 illustrated in FIG. 3, the first lower thrust gap 52, the side gap 54, and the second lower thrust gap 53 are arranged to together define a single continuous bladder structure 5. The lubricating oil 46 is arranged continuously in the bladder structure 5. Within the bladder structure 5, a surface of the lubricating oil 46 is defined only in the seal gap 55 illustrated in FIG. 5.

The upper surface of the bearing portion 44 and a lower surface of the bushing 25, which is fixed to the upper portion of the shaft 41, are arranged to together define a minute horizontal gap 501 therebetween. The horizontal gap 501 is arranged to extend radially and perpendicularly to the central axis J1. The axial width of the horizontal gap 501 is arranged to be small enough to prevent entry of dust into the bearing mechanism 4 therethrough. The axial width of the horizontal gap 501 is preferably arranged to be 200 µm or less. More preferably, the axial width of the horizontal gap 501 is arranged to be 100 µm or less. The outer circumferential surface of the bushing 25 and the inner circumferential surface of the bearing support portion 31 are arranged to together define a minute vertical gap 502 therebetween. The vertical gap 502 is arranged to extend in the axial direction, and is arranged in an annular shape centered on the central axis J1. The vertical gap 502 is connected with a radially outer end portion of the horizontal gap 501. In the fan 1, the horizontal gap 501 is defined as a result of assembling of the bearing mechanism 4, while the vertical gap 502 is defined as a result of the bearing mechanism 4 being attached to the bearing support portion 31. The seal gap 55 is arranged to be in communication with an exterior space through the horizontal gap 501 and the vertical gap 502. The term "exterior space" as used herein refers to a space above the stator 32 as illustrated in FIG. 1.

Each of the axial width of the horizontal gap 501 and the radial width of the vertical gap 502 is arranged to be smaller than the radial width of an upper end opening of the seal gap 55. The width of the horizontal gap 501 refers, precisely, to a minimum width of the horizontal gap 501. The width of the vertical gap 502 refers, precisely, to a minimum width of the vertical gap 502. The width of the upper end opening of the seal gap 55 corresponds to a maximum width of the seal gap 55. The maximum width of the seal gap 55 means a maximum width of a region of the seal gap 55 in which the lubricating oil 46 can be retained. Since the width of each of the horizontal gap 501 and the vertical gap 502 is smaller than the width of the upper end opening of the seal gap 55, a labyrinth having a width smaller than that of the upper end opening of the seal gap 55 is defined in the horizontal gap 501 and the vertical gap 502. Provision of the horizontal gap 501 and the vertical gap 502 contributes to preventing an air including a lubricating oil evaporated from the seal portion 55a from traveling out of the bearing mechanism 4. This contributes to reducing evaporation of the lubricating oil 46 out of the bearing mechanism 4. In other words, a labyrinth structure is defined by a combination of the horizontal gap 501 and the vertical gap 502.

As a result, an improved life of the fan 1 is achieved. In addition, since the labyrinth structure is defined by using the bushing 25, the rotating portion 2 is not required to have a complicated structure. Since each of the bushing 25 and the bearing portion 44 is made of a metal, the horizontal gap 501 can be defined with high precision. In addition, a reduction in the probability of adhesion of dust to the bushing 25 through static electricity and of entry of dust into the labyrinth structure is achieved. Note that the bushing 25 may be made of a non-metallic material as long as the bushing 25 can be shaped with high precision.

Figure 6:
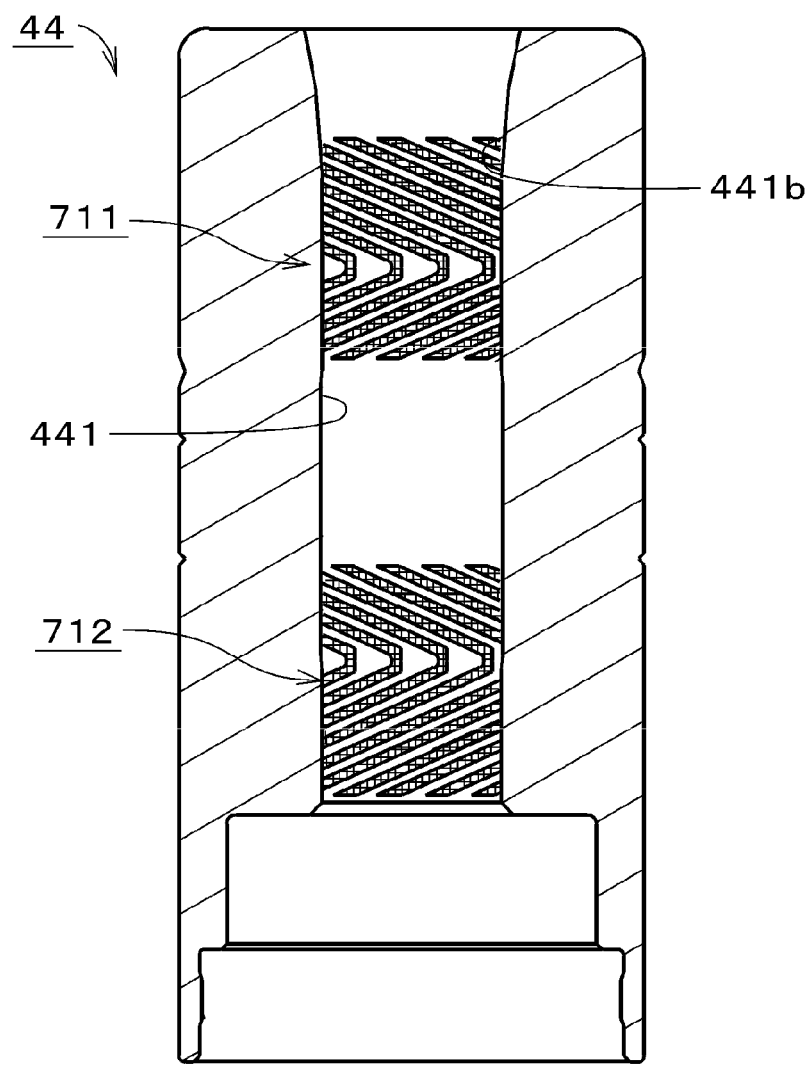
FIG. 6 is a cross-sectional view of a bearing portion according to the first preferred embodiment.

FIG. 6 is a vertical cross-sectional view of the bearing portion 44. The upper portion and the lower portion of the inner circumferential surface 441 of the bearing portion 44 include a first radial dynamic pressure groove array 711 and a second radial dynamic pressure groove array 712, respectively, defined therein. Each of the first and second radial dynamic pressure groove arrays 711 and 712 is arranged in a herringbone pattern. An outer circumferential surface of the bearing portion 44 includes minute recessed portions defined therein. The minute recessed portions are arranged axially between the first and second radial dynamic pressure groove arrays 711 and 712. Referring to FIG. 3, in an upper portion of the radial gap 51, an upper radial dynamic pressure bearing portion 681 arranged to generate a radial fluid dynamic pressure acting on the lubricating oil 46 is defined through the first radial dynamic pressure groove array 711. In a lower portion of the radial gap 51, a lower radial dynamic pressure bearing portion 682 arranged to generate a radial fluid dynamic pressure acting on the lubricating oil 46 is defined through the second radial dynamic pressure groove array 712. Hereinafter, the upper and lower radial dynamic pressure bearing portions 681 and 682 will be referred to collectively as a "radial dynamic pressure bearing portion 68". The radial dynamic pressure bearing portion 68 is arranged axially between the two balance correction portions 124a and 125 illustrated in FIG. 1. The radial dynamic pressure bearing portion 68 is defined by a combination of the inner circumferential surface 441 of the bearing portion 44, the outer circumferential surface 411 of the shaft 41, and a portion of the lubricating oil 46 which exists in the radial gap 51.

The seal gap 55 illustrated in FIG. 5 is arranged above the radial dynamic pressure bearing portion 68, and is arranged to be continuous with the radial dynamic pressure bearing portion 68. In addition, the radial dynamic pressure bearing portion 68 is arranged axially between the two balance correction portions 124a and 125 illustrated in FIG. 1. Furthermore, the upper radial dynamic pressure bearing portion 681 is arranged to overlap with a center of gravity of each of the motor 11 and the impeller 12 in a radial direction.

Figure 7:
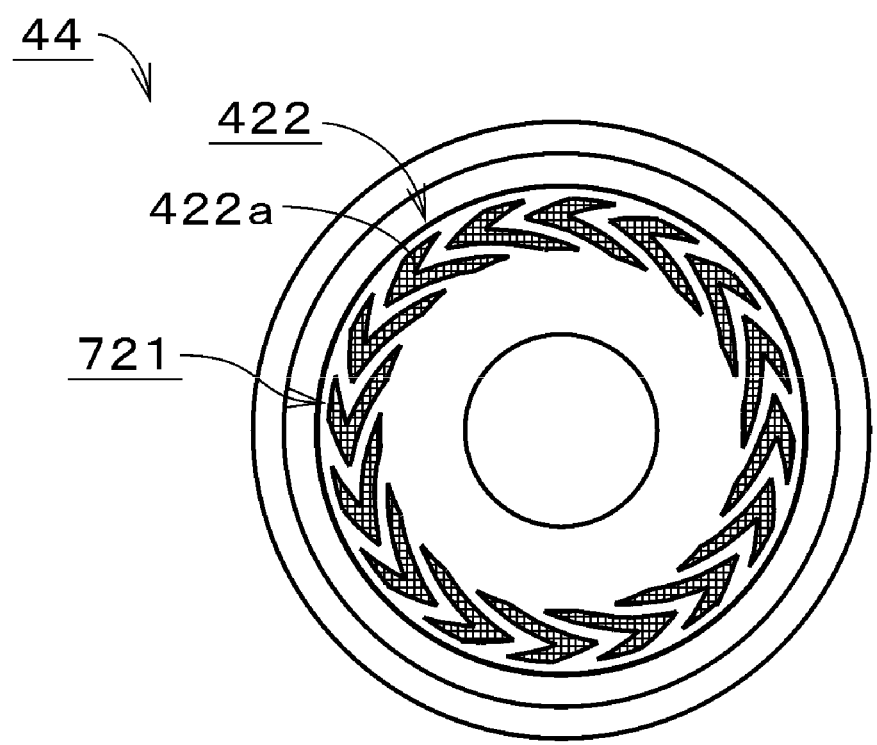
FIG. 7 is a bottom view of the bearing portion.
Figure 8:
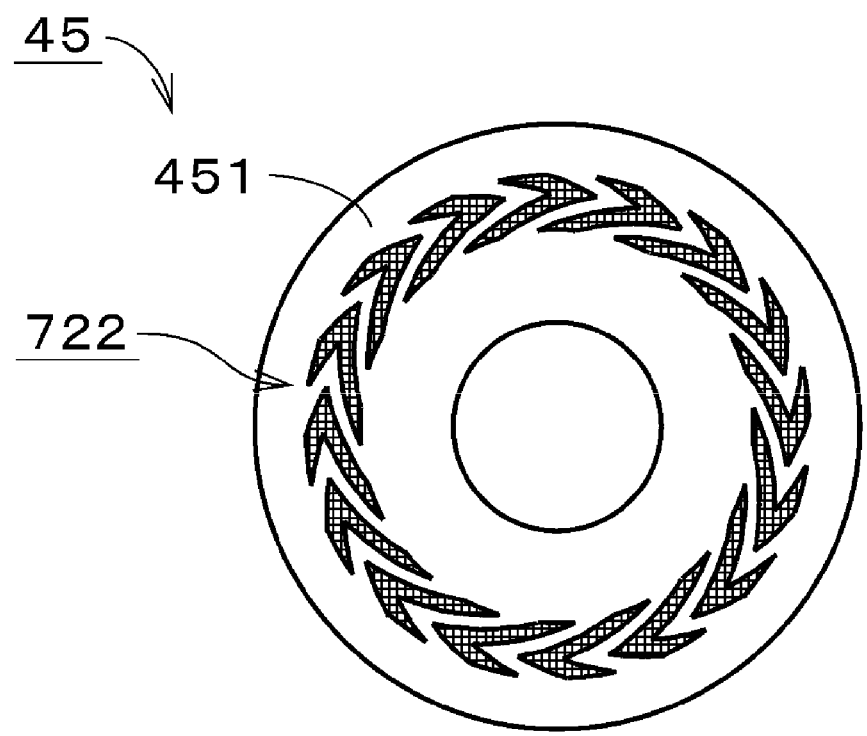
FIG. 8 is a plan view of a thrust cap according to the first preferred embodiment.

FIG. 7 is a bottom view of the bearing portion 44. The lower surface 442a of the first shoulder portion 442 includes a first thrust dynamic pressure groove array 721 arranged in the herringbone pattern. FIG. 8 is a plan view of the thrust cap 45. The upper surface 451 of the thrust cap 45, that is, a bottom surface of the bladder structure 5 illustrated in FIG. 3, includes a second thrust dynamic pressure groove array 722 arranged in the herringbone pattern. Referring to FIG. 3, in the first lower thrust gap 52, a first lower thrust dynamic pressure bearing portion 691 arranged to generate an axial fluid dynamic pressure acting on the lubricating oil 46 is defined through the first thrust dynamic pressure groove array 721. In addition, in the second lower thrust gap 53, a second lower thrust dynamic pressure bearing portion 692 arranged to generate an axial fluid dynamic pressure acting on the lubricating oil 46 is defined through the second thrust dynamic pressure groove array 722.

While the motor 11 is driven, the shaft 41 is supported in the radial direction by the radial dynamic pressure bearing portion 68, and the thrust plate 42, which is arranged above a bottom portion of the bladder structure 5, is supported in a thrust direction by the first and second lower thrust dynamic pressure bearing portions 691 and 692. As a result, the rotating portion 2 and the impeller 12 illustrated in FIG. 1 are supported to be rotatable about the central axis J1 with respect to the stationary portion 3. While the motor 11 is driven, the lubricating oil 46 circulates through the first lower thrust gap 52, the side gap 54, the second lower thrust gap 53, and the communicating hole 421a illustrated in FIG. 3. In addition, the inclined surface 422a is defined in the outer edge portion of the upper surface of the thrust plate 42 as illustrated in FIG. 4, and this contributes to preventing the thrust plate 42 from coming into hard contact with the lower surface 442a of the first shoulder portion 442 of the bearing portion 44 even when the shaft 41 is tilted.

Provision of the first and second lower thrust dynamic pressure bearing portions 691 and 692 in the motor 11 contributes to stabilizing the axial position of the rotating portion 2 relative to the stationary portion 3 during rotation of the impeller 12. This makes it easy to design the horizontal gap 501 with a small axial width. Note that the horizontal gap 501 is designed to have a sufficient width to prevent the lower surface of the bushing 25 from coming into contact with the upper surface of the bearing portion 44 even when the thrust plate 42 is brought into contact with the thrust cap 45.

Referring to FIG. 6, a portion of the first radial dynamic pressure groove array 711 is defined in a lower portion of the second inclined surface 441b. Referring to FIG. 5, when the shaft 41 is slightly tilted while the fan 1 is driven, a fluid dynamic pressure is generated by the first radial dynamic pressure groove array 711 in a gap 56 defined between a portion of the outer circumferential surface 411 of the shaft 41 which approaches the second inclined surface 441b and a portion of the second inclined surface 441b which is opposed to this portion of the outer circumferential surface 411. As a result, the shaft 41 is supported by the second inclined surface 441b. Thus, when the shaft 41 is tilted during rotation of the rotating portion 2, the second inclined surface 441b extends along the outer circumferential surface 411 of the shaft 41 in the gap 56, which is located below and adjacent to the seal gap 55. The shaft 41 is thus prevented from coming into hard contact with the upper portion of the bearing portion 44.

Figure 9:
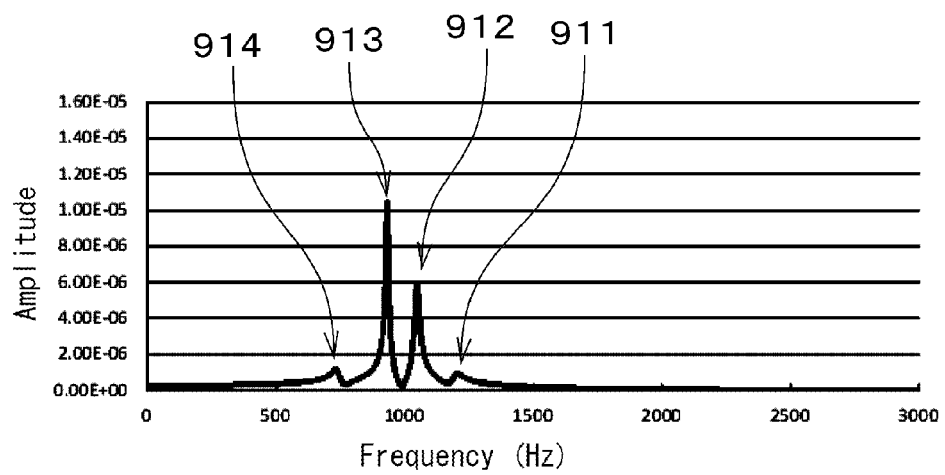
FIG. 9 is a graph showing a result of a simulation of vibration that occurs in the fan.
Figure 10:
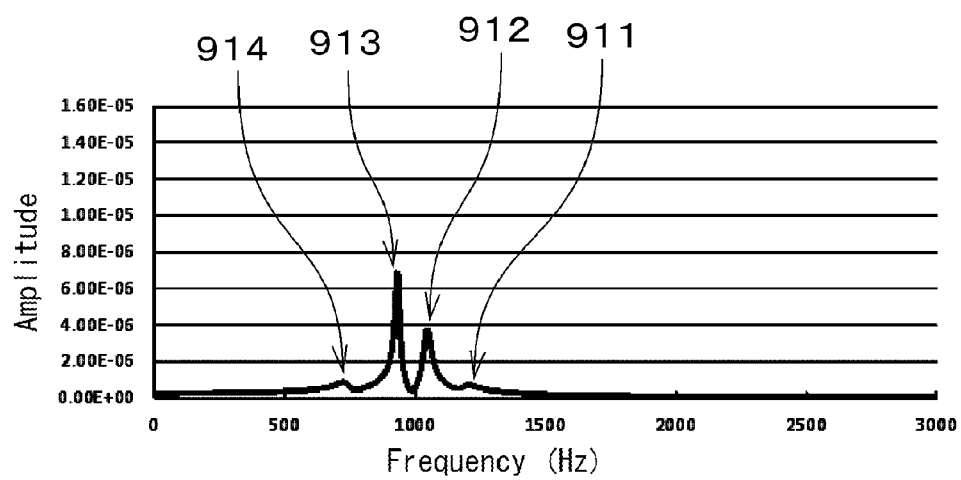
FIG. 10 is a graph showing a result of a simulation of vibration that occurs in the fan.
Figure 11:
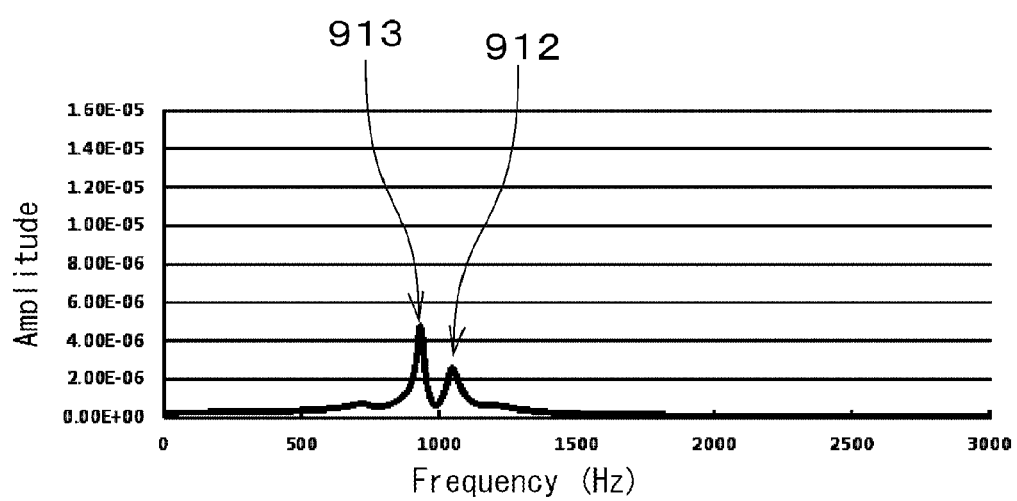
FIG. 11 is a graph showing a result of a simulation of vibration that occurs in the fan.
Figure 1:
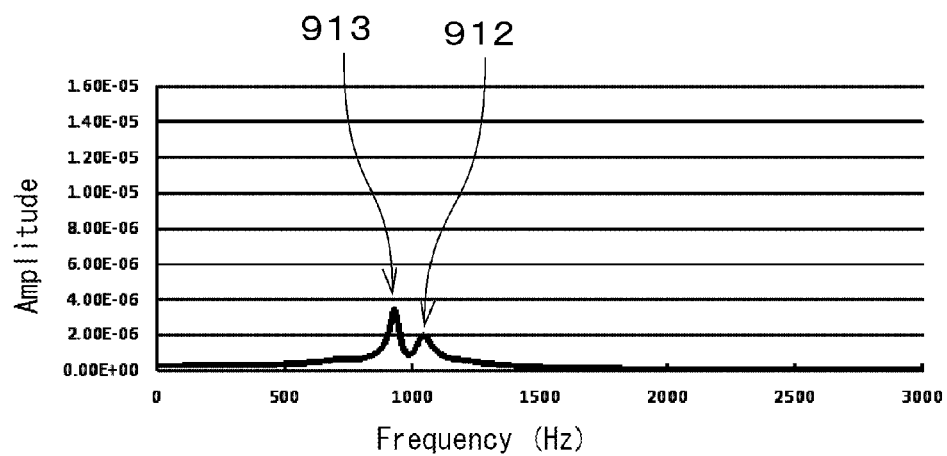
Figure 13:
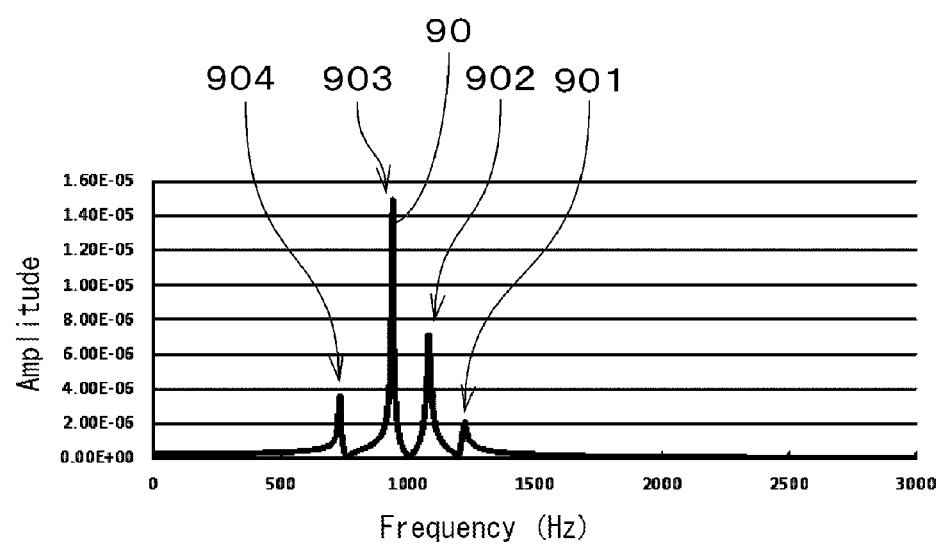
FIG. 13 is a graph showing a result of a simulation of vibration that occurs in a fan as a comparative example.

FIG. 9 is a graph showing a result of a simulation of vibration that occurs in the fan 1 in the case where the radial width of the radial gap 51 is 3 µm. A horizontal axis represents frequencies of the vibration, while a vertical axis represents the amplitude of each frequency component of the vibration. FIGS. 10, 11, and 12 are graphs showing results of simulations of vibration that occurs in the fan 1 in the case where the radial width of the radial gap 51 is 4 µm, 5 µm, and 6 µm, respectively. FIG. 13 is a graph showing a result of a simulation of vibration that occurs in a fan as a comparative example in which a motor including a ball bearing is installed.

As indicated by a curve 90 in FIG. 13, in the case of the vibration that occurs in the fan including the ball bearing, a plurality of peaks occur in the range of 750 Hz to 1250 Hz. In FIG. 13, the peaks are denoted, from right to left, by reference numerals 901, 902, 903, and 904, respectively. In contrast, referring to FIGS. 9 and 10, in the case of the bearing mechanisms 4 in which the width of the radial gap is 3 µm and 4 µm, respectively, corresponding peaks 911, 912, 913, and 914 are lower than the peaks 901, 902, 903, and 904, respectively, in FIG. 13. Further, referring to FIGS. 11 and 12, in the case of the bearing mechanisms 4 in which the width of the radial gap 51 is 5 µm and 6 µm, respectively, peaks do not occur at positions corresponding to those of the peaks 901 and 904 on the far right and on the far left, respectively, in FIG. 13. Moreover, peaks 912 and 913 corresponding to the remaining peaks 902 and 903, respectively, are less than half as high as the peaks 902 and 903, respectively.

As described above, the fan 1 is able to achieve reduced vibration as compared to known fans in which ball bearings are used. This is due to a so-called damper effect produced by the lubricating oil 46 between the shaft 41 and the bearing portion 44. In particular, a satisfying reduction in the vibration can be achieved when the radial width of the radial gap 51 is 5 µm or greater. The radial width of the radial gap 51 is arranged to be 20 µm or less in order to generate a sufficient fluid dynamic pressure in the radial gap 51.

The fan 1 has been described above. Use of the bearing mechanism 4, which is a fluid dynamic bearing mechanism, in the fan 1 contributes to reducing the vibrations of the fan 1. The reduction in the vibrations of the fan 1 leads to a reduction in power consumption of the fan 1. Moreover, since the evaporation of the lubricating oil 46 is reduced by the labyrinth structure using the bushing 25, an increased life of the bearing mechanism 4 is easily achieved, and the bearing mechanism 4 can be structured in a manner suited to the reduced vibration of the fan 1. Provision of the horizontal gap 501 contributes to preventing dust from entering into the bearing mechanism 4 when the bearing mechanism 4 is attached to another component of the fan 1. The same is true of other preferred embodiments of the present invention described below. This makes it possible to assemble the fan 1 without a need to use an exceedingly clean facility. Furthermore, even when the bearing mechanism 4 is transported into the facility, dust is prevented from entering into the bearing mechanism 4. Once the fan 1 is assembled, the vertical gap 502 is provided, and both the horizontal gap 501 and the vertical gap 502 prevent dust from entering into the bearing mechanism 4.

In the case of a fluid dynamic bearing mechanism in which seal portions are defined in an upper portion and a lower portion of a bearing portion thereof, a sophisticated design is required to prevent a difference in pressure between the seal portions from causing a leakage of the lubricating oil 46. In contrast, in the case of the bearing mechanism 4 of the motor 11, the bearing mechanism 4 includes the bladder structure 5, and the lubricating oil 46 is arranged continuously in the bladder structure 5. That is, the bearing mechanism 4 of the motor 11 has a so-called full-fill structure, including only one seal portion 55a. It is therefore easy to prevent a leakage of the lubricating oil 46 in the case of the bearing mechanism 4. In addition, the surface of the lubricating oil 46 in the seal portion 55a can be maintained at a substantially fixed position. Moreover, a reduction in the evaporation of the lubricating oil 46 is achieved compared to the case where a plurality of seal portions are provided. In particular, because the seal portion 55a is arranged in an inner portion of the motor 11, inside of the horizontal gap 501 and the vertical gap 502, the seal portion 55a is not exposed to air currents while the fan 1 is driven. A further reduction in the evaporation of the lubricating oil 46 is thereby achieved. Furthermore, entry of an extraneous material, such as dust, into the seal portion 55a can be prevented. In the bearing mechanism 4, because the seal portion 55a is defined around the shaft 41, a leakage of the lubricating oil 46 out of the seal portion 55a owing to a centrifugal force can be prevented more effectively than in the case where the seal portion is arranged away from and radially outward of the shaft 41.

Because the sum of the axial width of the first lower thrust gap 52 and the axial width of the second lower thrust gap 53 is arranged in the range of about 10 µm to about 40 µm, the fluid dynamic pressures can be generated while ensuring the damper effect owing to the lubricating oil 46.

Because the second inclined surface 441b in which a portion of the first radial dynamic pressure groove array 711 is defined is arranged in the inner circumferential surface 441 of the bearing portion 44, it is possible to support the shaft 41 sufficiently even if the radial gap 51 is widened. Consequently, it is possible to prevent a reduction in bearing rigidity even when the fan 1 is caused to rotate at a high speed or in a high-temperature condition.

Because the motor 11 is a three-phase motor, the motor 11 is capable of being rotated at a high speed. It is therefore easy to cause the frequencies of the vibration that can occur in the motor 11 to deviate from a frequency band that may affect another device in an electronic device in which the fan 1 is installed.

The magnetic member 331 provided in the motor 11 generates the magnetic attraction force that attracts the rotor magnet 22 downward. This contributes to reducing an increase in a bearing loss that occurs in the first lower thrust dynamic pressure bearing portion 691, while the fan 1 is driven, owing to the force that acts to lift the impeller 12 relative to the stationary portion 3. Moreover, the additional magnetic attraction force that attracts the rotor magnet 22 downward is generated because the magnetic center of the stator 32 is arranged at a level lower than that of the magnetic center of the rotor magnet 22. This contributes to further reducing the increase in the bearing loss that occurs in the first lower thrust dynamic pressure bearing portion 691.

Because the radial dynamic pressure bearing portion 68 is arranged axially between the two balance correction portions 124a and 125, each of the rotating portion 2 and the impeller 12 is capable of stable rotation, and a further reduction in the vibrations is thereby achieved. In addition, it is possible to reduce the axial length of the radial dynamic pressure bearing portion 68, and to shorten the bearing portion 44. This makes it possible to manufacture the bearing portion 44 with high precision. The axial length of the bearing portion 44 is preferably arranged to be less than about four times the diameter of the bearing portion 44. Because the upper radial dynamic pressure bearing portion 681 is arranged to overlap with the center of gravity of each of the motor 11 and the impeller 12 in the radial direction, stability of the rotation of each of the rotating portion 2 and the impeller 12 is increased, and a further reduction in the vibrations is thereby achieved. The same is true of other preferred embodiments of the present invention described below.

In the motor 11, an upper end of the stator core 321 is arranged to overlap with the upper radial dynamic pressure bearing portion 681 in the radial direction. As a result of the stator 32 being arranged at a high position as described above, the magnetic center of the stator 32 can be arranged between the upper and lower radial dynamic pressure bearing portions 681 and 682. This leads to stable rotation of the motor 11. A lower end of the stator core 321 is preferably arranged to overlap with the lower radial dynamic pressure bearing portion 682 in the radial direction. Further preferably, a center of gravity of a combination of the impeller 12 and the rotating portion 2 is arranged to overlap with the upper radial dynamic pressure bearing portion 681 in the radial direction.

Figure 14:
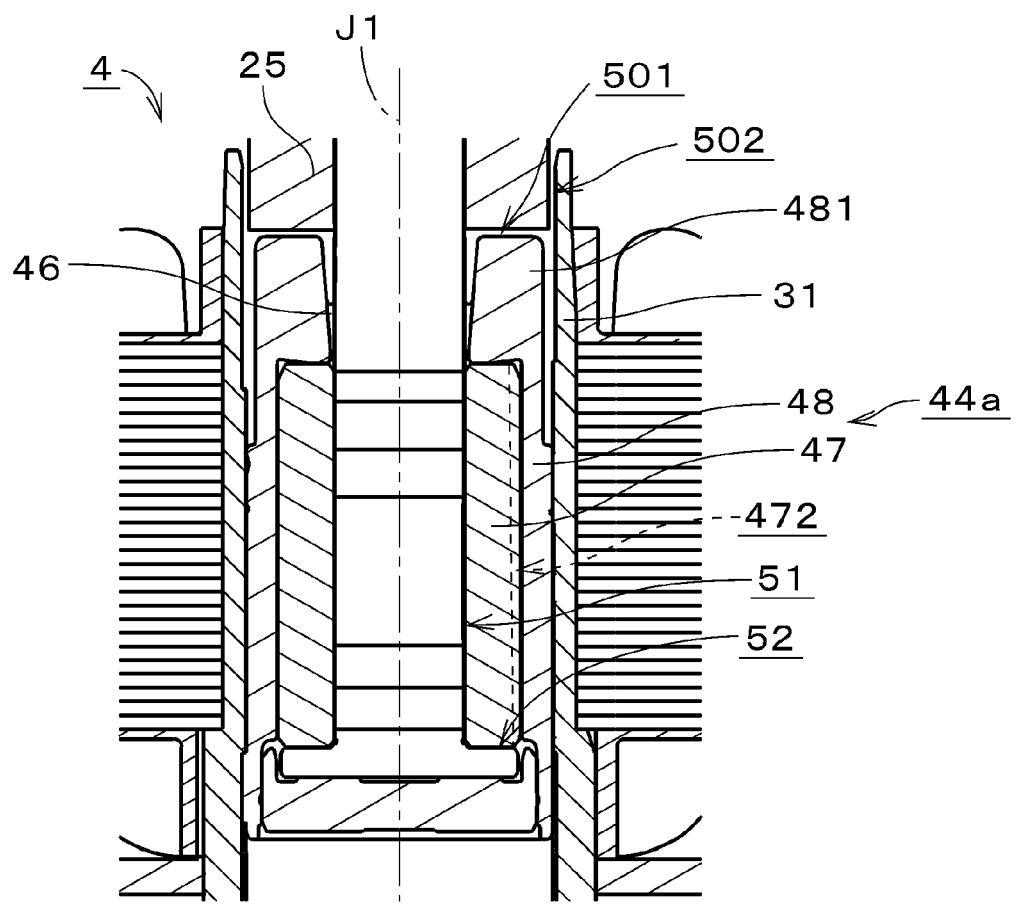
FIG. 14 is a cross-sectional view of a bearing mechanism according to a modification of the first preferred embodiment.

FIG. 14 is a diagram illustrating a bearing mechanism 4 according to a modification of the first preferred embodiment. A bearing portion 44a of the bearing mechanism 4 includes a tubular sleeve 47 and a bearing housing 48. The sleeve 47 is defined by a metallic sintered body. The sleeve 47 is impregnated with a lubricating oil 46. The bearing housing 48 is arranged to cover an outer circumferential surface of the sleeve 47. The bearing housing 48 is arranged to have an outside diameter substantially equal to an outside diameter of a bushing 25. The bearing housing 48 includes an annular upper portion 481 arranged to extend radially inward on an upper side of the sleeve 47. A circulation channel 472 arranged to extend in the axial direction is defined between an outer circumferential surface of the sleeve 47 and an inner circumferential surface of the bearing housing 48. The lubricating oil 46 is arranged to circulate through the circulation channel 472, a gap defined between a lower surface of the annular upper portion 481 and an upper surface of the sleeve 47, a radial gap 51, and a first lower thrust gap 52.

Figure 15:
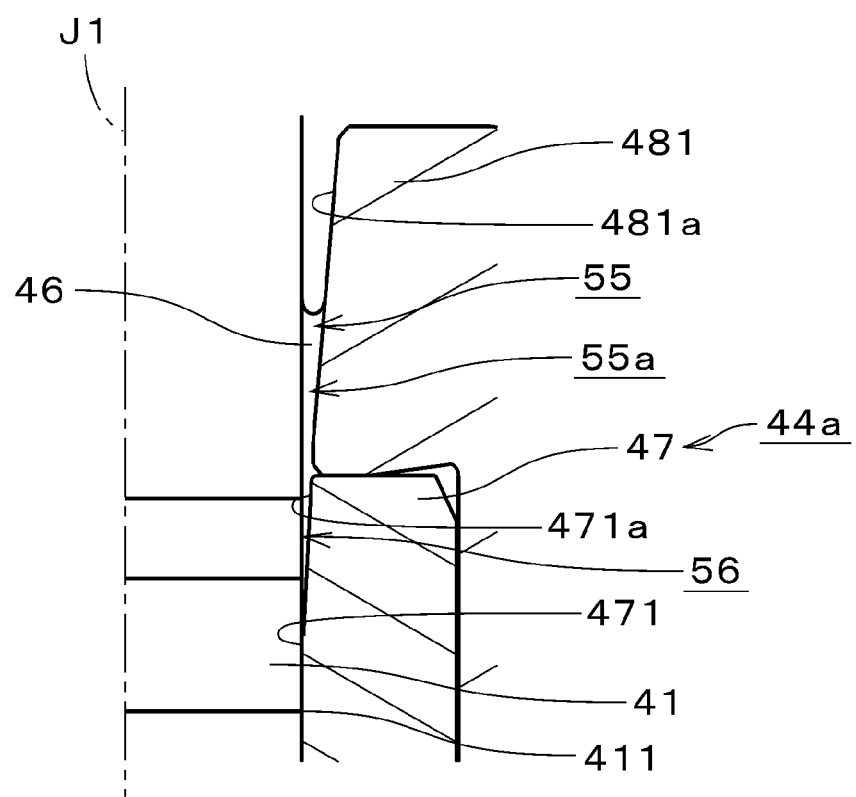
FIG. 15 is a cross-sectional view illustrating a portion of the bearing mechanism.

Referring to FIG. 15, an inner circumferential surface 481a of the annular upper portion 481 is an inclined surface whose diameter gradually increases with increasing height. In other words, the inner circumferential surface 481a is arranged to be inclined radially inward with decreasing height. Hereinafter, the inner circumferential surface 481a will be referred to as a "first inclined surface 481a". An upper portion of an inner circumferential surface 471 of the sleeve 47 includes an inclined surface 471a whose diameter gradually increases with increasing height. In other words, the inclined surface 471a is arranged to be inclined radially inward with decreasing height. Hereinafter, the inclined surface 471a will be referred to as a "second inclined surface 471a". An angle defined by the first inclined surface 481a with a central axis J1 is arranged to be greater than an angle defined by the second inclined surface 471a with the central axis J1. The bearing mechanism 4 according to the present modification of the first preferred embodiment is otherwise similar in structure to the bearing mechanism 4 illustrated in FIG. 3.

A seal gap 55 arranged to gradually increase in radial width with increasing height is defined between the first inclined surface 481a and an outer circumferential surface 411 of a shaft 41. Adjacent to and below the seal gap 55, a gap 56 is defined between the outer circumferential surface 411 of the shaft 41 and the second inclined surface 471a. The seal gap 55 includes a seal portion 55a arranged to retain the lubricating oil 46 through capillary action. A surface of the lubricating oil 46 is defined in the seal portion 55a. Because the seal portion 55a is defined around the shaft 41, a leakage of the lubricating oil 46 out of the seal portion 55a due to a centrifugal force is prevented.

A portion of a first radial dynamic pressure groove array 711 similar to the first radial dynamic pressure groove array 711 illustrated in FIG. 6 is defined in a lower portion of the second inclined surface 471a. When the shaft 41 is slightly tilted while a fan 1 is driven, the second inclined surface 471a extends along the outer circumferential surface 411 of the shaft 41, so that a fluid dynamic pressure is generated in the gap 56. The shaft 41 is thereby supported by the second inclined surface 471a so that the shaft 41 can be prevented from coming into hard contact with an upper portion of the bearing portion 44a.

Also in the bearing mechanism 4 according to the present modification of the first preferred embodiment, a horizontal gap 501 arranged to extend perpendicularly to the central axis J1 is defined between a lower surface of the bushing 25 and an upper surface of the bearing portion 44a. A vertical gap 502 extending in the axial direction and arranged in an annular shape centered on the central axis J1 is defined between an outer circumferential surface of the bushing 25 and an inner circumferential surface of a bearing support portion 31. The seal gap 55 is arranged to be in communication with an exterior space through the horizontal gap 501 and the vertical gap 502. Each of a minimum axial width of the horizontal gap 501 and a minimum radial width of the vertical gap 502 is arranged to be smaller than a maximum radial width of an opening of the seal gap 55. Since each of the horizontal gap 501 and the vertical gap 502 has a width smaller than the maximum width of the opening of the seal gap 55, a labyrinth having a width smaller than the maximum width of the seal gap 55 is defined therein. Provision of the horizontal gap 501 and the vertical gap 502 contributes to preventing an air including a lubricating oil evaporated from the seal portion 55a from traveling out of the bearing mechanism 4. This contributes to reducing evaporation of the lubricating oil 46 out of the bearing mechanism 4. Furthermore, entry of an extraneous material, such as dust, into the seal portion 55a can be prevented.

Figure 16:
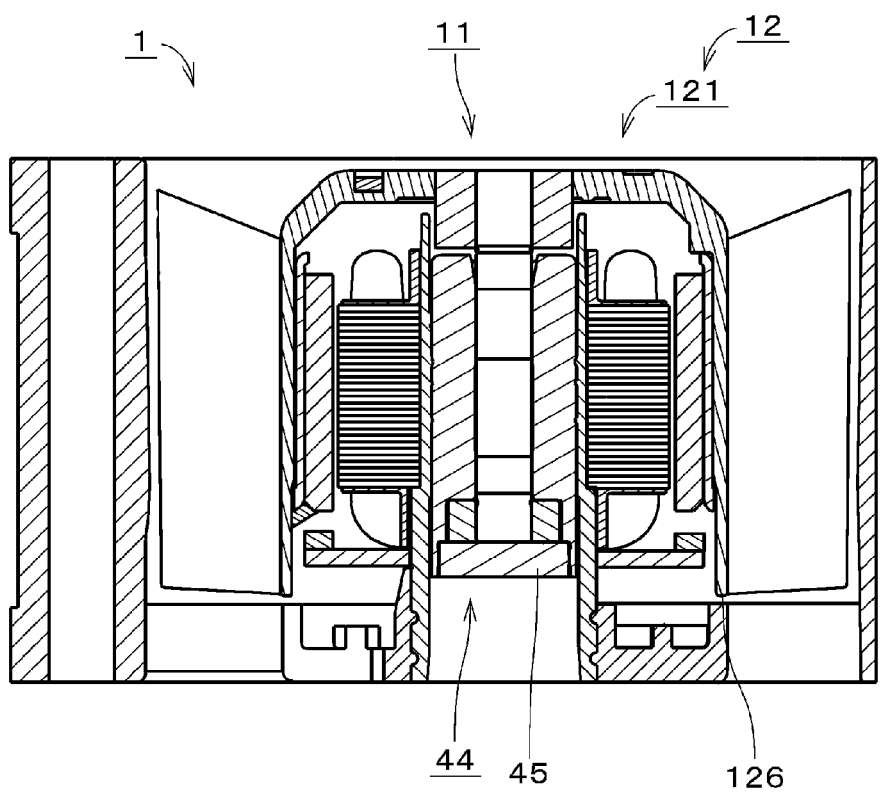
FIG. 16 is a cross-sectional view of a fan according to a modification of the first preferred embodiment.

FIG. 16 is a cross-sectional view of a fan 1 according to another modification of the first preferred embodiment. The fan 1 illustrated in FIG. 16 is different from the fan 1 illustrated in FIG. 1 in that an impeller 12 is arranged to extend farther downward than a motor 11, so that the entire motor 11 is accommodated in a cup 121 of the impeller 12. The fan 1 illustrated in FIG. 16 is otherwise similar in structure to the fan 1 illustrated in FIG. 1.

In the fan 1, a thrust cap 45, which is arranged at a lower end of a bearing portion 44, is arranged at a level higher than that of a lower end 126 of the impeller 12. The lower end of the bearing portion 44 is normally arranged at a lowermost end of the motor 11. Therefore, a center of gravity of the motor 11 is thereby arranged inside of the impeller 12, which leads to increased stability of rotation of the impeller 12. Since a three-phase motor, even in a reduced size, is capable of rotating an impeller in a satisfactory manner, the above structure is especially suitable for the case where the three-phase motor is adopted.

Figure 17:
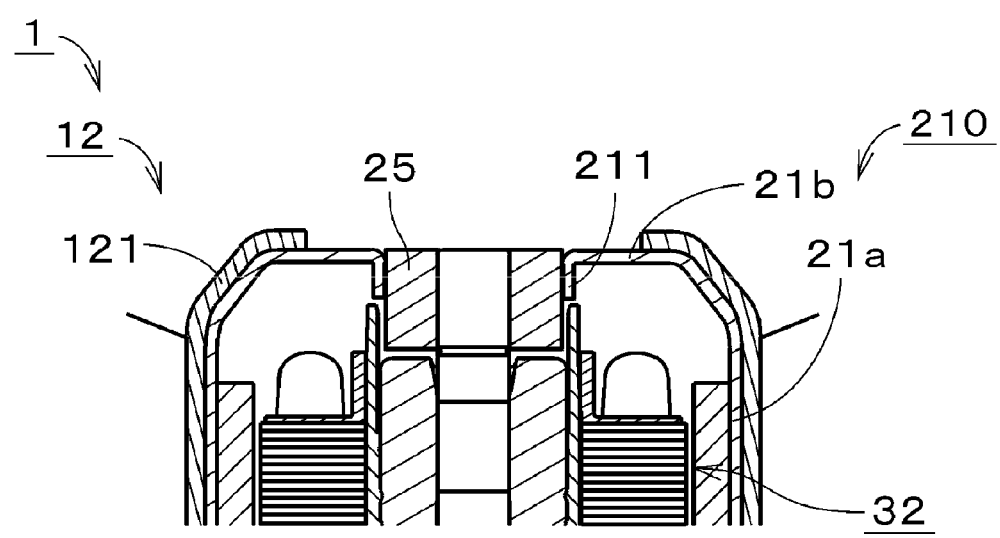
FIG. 17 is a diagram illustrating a structure in which a bushing and a rotor holder are fixed to each other according to a modification of the first preferred embodiment.

FIG. 17 is a diagram illustrating a structure in which a bushing 25 and an impeller 12 are joined to each other according to a modification of the first preferred embodiment. The impeller 12 illustrated in FIG. 17 includes a cup 121 having an inner surface fixed to a rotor holder 210 arranged substantially in the shape of a covered cylinder. A top face portion of the cup 121 includes a large central opening defined therein. The rotor holder 210 includes a cylindrical portion 21a and a top face portion 21b. The top face portion 21b is arranged to spread perpendicularly to a central axis J1. The cylindrical portion 21a is arranged substantially in the shape of a cylinder, and is arranged to extend downward from an outer edge portion of the top face portion 21b. The rotor holder 210 is made of a metal, and the cylindrical portion 21a functions as the yoke 21 illustrated in FIG. 1. A central portion of the top face portion 21b, that is, an inner edge portion of the top face portion 21b, includes a cylindrical burring portion 211 arranged to extend downward from the inner edge portion thereof. An inner circumferential surface of the burring portion 211 is press fitted to an outer circumferential surface of the bushing 25, whereby the rotor holder 210 is fixed to the bushing 25. The impeller 12 is thereby indirectly fixed to an upper portion of a shaft 41. The impeller 12 and the bushing 25 are securely fixed to each other through joining of the metallic members.

Figure 18:
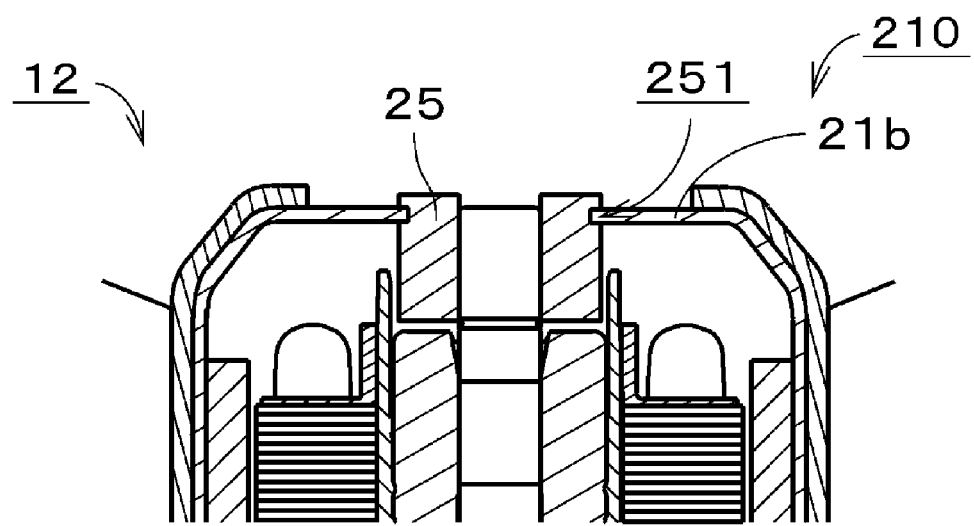
FIG. 18 is a diagram illustrating a structure in which a bushing and a rotor holder are fixed to each other according to a further modification of the first preferred embodiment.

FIG. 18 is a diagram illustrating a structure in which a bushing 25 and an impeller 12 are joined to each other according to a further modification of the first preferred embodiment. While the impeller 12 has a structure substantially the same as that of the impeller 12 illustrated in FIG. 17, a rotor holder 210 does not include the burring portion. An outer circumferential surface of the bushing 25 includes an annular groove 251 defined therein, and an inner circumferential portion of a top face portion 21b is fixed in the groove 251 by crimping. Also in the joining structure illustrated in FIG. 18, the impeller 12 and the bushing 25 are securely fixed to each other through joining of the metallic members.

Figure 19:
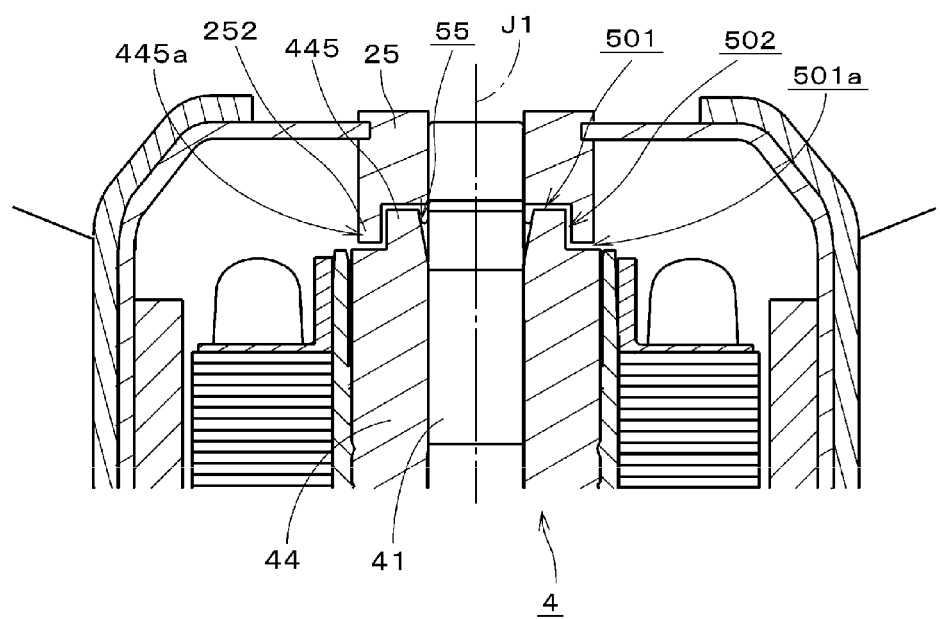
FIG. 19 is a diagram illustrating a labyrinth structure according to a modification of the first preferred embodiment.

FIG. 19 is a diagram illustrating a labyrinth structure defined above a bearing portion 44 according to a modification of the first preferred embodiment. A bushing 25 includes, in an outer edge portion of a lower portion thereof, an outer annular portion 252 arranged to extend downward toward the bearing portion 44. The bearing portion 44 includes an inner annular portion 445 arranged to project upward toward the bushing 25 around a shaft 41. In other words, the bearing portion 44 includes, in an outer edge portion of an upper portion thereof, an annular recessed portion 445a arranged to be recessed in a direction away from the bushing 25. Hereinafter, the recessed portion 445a will be referred to as an "annular recessed portion 445a". The inner annular portion 445 can be regarded as a portion that defines a side surface of the annular recessed portion 445a. The outer annular portion 252 is arranged radially outside the inner annular portion 445.

That is, the outer annular portion 252 is arranged in the annular recessed portion 445a. A horizontal gap 501 arranged to spread perpendicularly to a central axis J1 is defined by a portion of a lower surface of the bushing 25 which is radially inward of the outer annular portion 252 and an upper surface of the inner annular portion 445 of the bearing portion 44. Hereinafter, the horizontal gap 501 will be referred to as a "first horizontal gap 501". A vertical gap 502 arranged to extend in the axial direction and arranged in an annular shape centered on the central axis J1 is defined by an inner circumferential surface of the outer annular portion 252 and an outer circumferential surface of the inner annular portion 445. An upper end of the vertical gap 502 is connected with a radially outer end portion of the first horizontal gap 501. Another horizontal gap 501a arranged to spread perpendicularly to the central axis J1 is defined between a lower surface of the outer annular portion 252 and a bottom surface of the annular recessed portion 445a, which is arranged axially opposite the lower surface of the outer annular portion 252, that is, a surface radially outward of the inner annular portion 445. Hereinafter, the horizontal gap 501a will be referred to as a "second horizontal gap 501a". A lower end of the vertical gap 502 is connected with a radially inner end portion of the second horizontal gap 501a.

In FIG. 19, each of a minimum axial width of the first horizontal gap 501 and a minimum radial width of the vertical gap 502 is arranged to be smaller than a maximum radial width of an opening of a seal gap 55. Provision of the first horizontal gap 501 and the vertical gap 502 contributes to reducing evaporation of a lubricating oil out of a bearing mechanism 4. The first horizontal gap 501 and the vertical gap 502 may be defined between the bushing 25 and the bearing portion 44 as described above. Further, provision of the second horizontal gap 501a contributes to more securely preventing the evaporation of the lubricating oil. A minimum axial width of the second horizontal gap 501 is arranged to be smaller than the maximum radial width of the opening of the seal gap 55. Provision of the first horizontal gap 501, the vertical gap 502, and the second horizontal gap 501a in the bearing mechanism 4 contributes to more securely preventing dust from entering into the bearing mechanism 4 when the bearing mechanism 4 and another component of a fan 1 are attached to each other. In the case where the vertical gap 502 is defined between the bushing 25 and the bearing portion 44 as described above, each of the first and second horizontal gaps 501 and 501a may not necessarily be a minute gap. Even when only the vertical gap 502 is a minute gap, dust is prevented from entering into the bearing mechanism 4 when the bearing mechanism 4 and another component of the fan 1 are attached to each other. This makes it possible to assemble the fan 1 without a need to use an exceedingly clean facility. Furthermore, even when the bearing mechanism 4 is transported into the facility, dust is prevented from entering into the bearing mechanism 4.

Note that, in a further modification of the bearing mechanism 4, an inner circumferential portion of a lower portion of the bushing 25 may be arranged to project into an inner circumferential portion of an upper portion of the bearing portion 44. In other words, it may be so arranged that an outer annular portion arranged to project toward the bushing 25 is arranged in an outer edge portion of the upper portion of the bearing portion 44, while an inner annular portion arranged to project toward the bearing portion 44 on a radially inner side of the outer annular portion is arranged in the lower portion of the bushing 25. The outer annular portion is arranged in an annular recessed portion defined radially outside the inner annular portion. A vertical gap 502 is defined between an outer circumferential surface of the inner annular portion, which is arranged in the lower portion of the bushing 25, and an inner circumferential surface of the outer annular portion, which is arranged in the upper portion of the bearing portion 44. Furthermore, it may be so arranged that the bushing 25 is increased in diameter, an outer circumferential portion of the bushing 25 is arranged to extend downward so that an upper portion of a bearing support portion 31 may be surrounded by a lower portion of the bushing 25 on a radially outer side thereof, and a vertical gap 502 is defined between an inner circumferential surface of the lower portion of the bushing 25 and an outer circumferential surface of the upper portion of the bearing support portion 31.

As described above, the vertical gap 502 is defined between a circumferential surface of the bushing 25 and a circumferential surface of the bearing support portion 31 or the bearing portion 44 in the vicinity of the seal portion. Also, the second horizontal gap 501a may be defined between the lower surface of the bushing 25 and an upper surface of the bearing support portion 31. Note that emission of a vaporized lubricating oil can be effectively prevented when a stationary body is arranged radially outward of a rotating body in the labyrinth structure.

Figure 20:
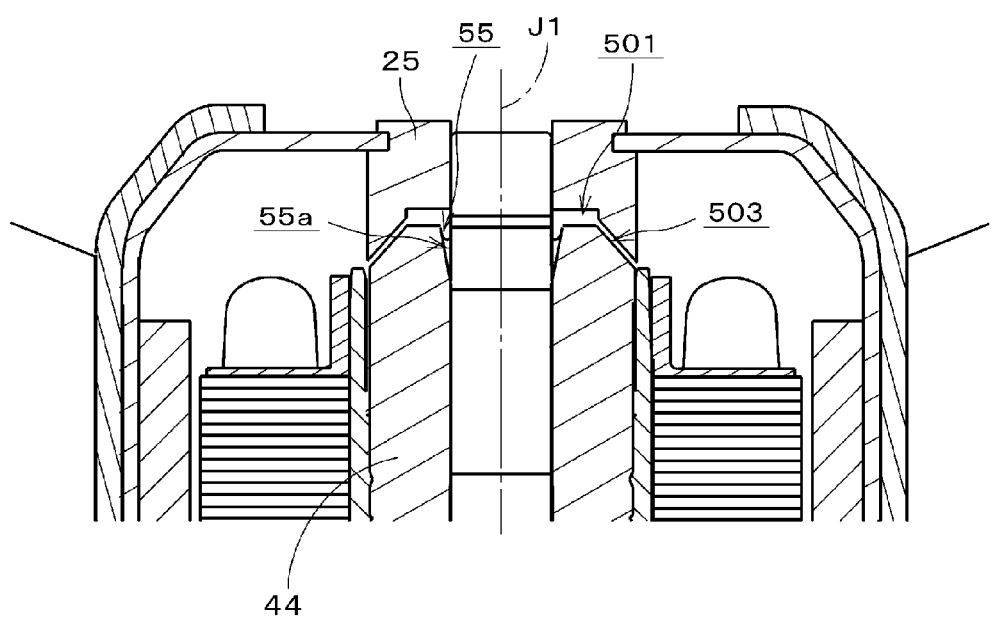
FIG. 20 is a diagram illustrating a labyrinth structure according to a modification of the first preferred embodiment.

FIG. 20 is a diagram illustrating a labyrinth structure defined above a bearing portion 44 according to another modification of the first preferred embodiment. A lower portion of a bushing 25 includes an inclined surface arranged to be inclined downward with increasing distance from a central axis J1. An upper portion of the bearing portion 44 also includes an inclined surface arranged to be inclined downward with increasing distance from the central axis J1. An inclined gap 503 arranged to be inclined downward with increasing distance from the central axis J1 is defined between these inclined surfaces. The inclined gap 503 is arranged in the shape of a conical surface centered on the central axis J1. A minimum width of the inclined gap 503 is arranged to be smaller than a maximum radial width of an opening of a seal gap 55. Note that the minimum width of the inclined gap 503 refers to a minimum distance between the aforementioned two inclined surfaces. A horizontal gap 501 is defined on a radially inner side of the inclined gap 503. The seal gap 55 is arranged to be in communication with an exterior space through the horizontal gap 501 and the inclined gap 503. Provision of the inclined gap 503 contributes to preventing an air including a lubricating oil evaporated from a seal portion 55a from traveling out of a bearing mechanism 4. Provision of the horizontal gap 501 and the inclined gap 503 in the bearing mechanism 4 contributes to more securely preventing dust from entering into the bearing mechanism 4 when the bearing mechanism 4 and another component of a fan 1 are attached to each other.

Note that an additional vertical gap or an additional horizontal gap which is continuous with a radially outer end portion of the inclined gap 503 may be provided. Also note that the inclined gap 503 may be arranged to be inclined upward with increasing distance from the central axis J1.

Figure 21:
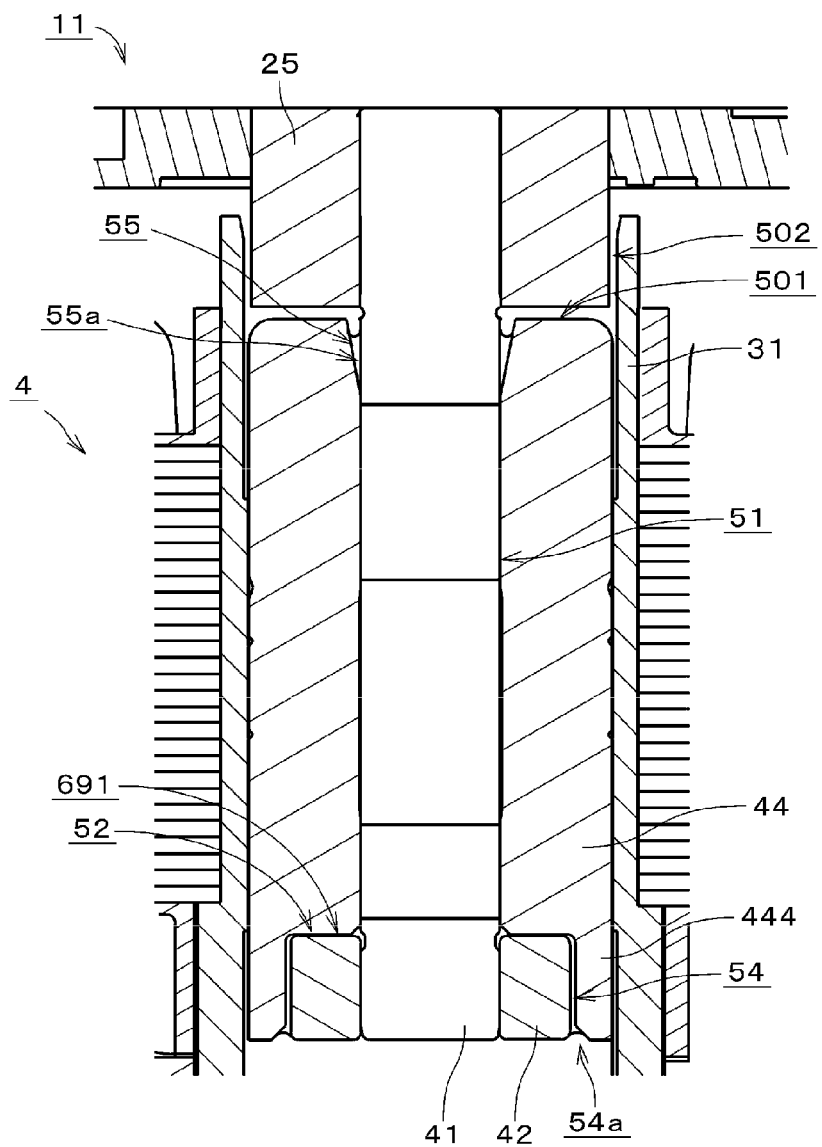
FIG. 21 is a cross-sectional view illustrating a bearing mechanism according to another modification of the first preferred embodiment.
Figure 2:
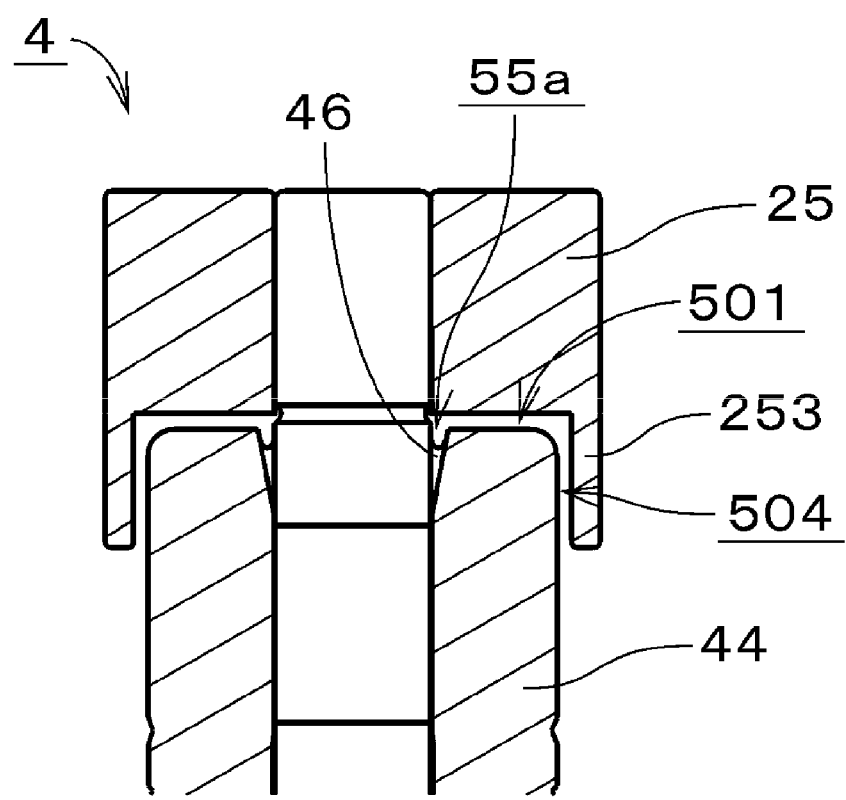

FIG. 21 is a diagram illustrating a bearing mechanism 4 according to another modification of the first preferred embodiment. The bearing mechanism 4 according to the present modification of the first preferred embodiment is similar in structure to the bearing mechanism 4 illustrated in FIG. 3. Accordingly, like members or portions are designated by like reference numerals, and redundant description is omitted. The bearing mechanism 4 does not include the thrust cap 45 illustrated in FIG. 3. A side gap 54 is defined between an outer circumferential surface of a thrust plate 42 and an inner circumferential surface of a lower end portion 444 of a bearing portion 44, and a seal portion 54a is defined in the side gap 54. The seal portion 54a is defined in a lower portion of the side gap 54, and is arranged to gradually increase in radial width with decreasing height. As a thrust dynamic pressure bearing portion, only a first lower thrust dynamic pressure bearing portion 691 is defined in a first lower thrust gap 52 defined between the bearing portion 44 and an upper surface of the thrust plate 42. An axial magnetic center of a rotor magnet and that of a stator are displaced from each other to cause an upward force to constantly act on a shaft 41. The bearing mechanism 4 is otherwise similar in structure to the bearing mechanism 4 illustrated in FIG. 3. A seal portion 55a similar to the seal portion 55a illustrated in FIG. 5 is defined in an upper portion of the bearing mechanism 4. Thus, the bearing mechanism 4 includes a plurality of seal portions.

Also in the bearing mechanism 4, a horizontal gap 501 is defined between a lower surface of a bushing 25 and an upper surface of the bearing portion 44, while a vertical gap 502 is defined between an outer circumferential surface of the bushing 25 and an inner circumferential surface of a bearing support portion 31. A seal gap 55 is arranged to be in communication with an exterior space through the horizontal gap 501 and the vertical gap 502. Each of a minimum axial width of the horizontal gap 501 and a minimum radial width of the vertical gap 502 is arranged to be smaller than a maximum radial width of an opening of the seal gap 55.

Also in the bearing mechanism 4 illustrated in FIG. 21, the radial width of a radial gap 51 is arranged to be 5 μm or greater so that a sufficient reduction in vibrations of a fan 1 can be achieved. Note, however, that the width of the radial gap 51 is arranged to be 20 μm or less in order to generate a sufficient fluid dynamic pressure in the radial gap 51.

FIG. 22 is a cross-sectional view illustrating a bearing mechanism 4 according to yet another modification of the first preferred embodiment. A bushing 25 of the bearing mechanism 4 includes an annular portion 253 arranged to extend downward outside of a bearing portion 44. A vertical gap 504 is defined between an inner circumferential surface of the annular portion 253 and an outer circumferential surface of the bearing portion 44. The bearing mechanism 4 is otherwise similar in structure to the bearing mechanism 4 illustrated in FIG. 2. In the bearing mechanism 4, a seal gap 55 is arranged to be in communication with an exterior space through a horizontal gap 501 defined between a lower surface of the bushing 25 and an upper surface of the bearing portion 44, and the vertical gap 504.

Provision of the horizontal gap 501 and the vertical gap 504 in the bearing mechanism 4 contributes to more securely preventing dust from entering into the bearing mechanism 4 when the bearing mechanism 4 and another component of a fan 1 are attached to each other. In the case where the vertical gap 504 is defined between the bushing 25 and the bearing portion 44 as described above, the horizontal gap 501 may not necessarily be a minute gap, with only the vertical gap 504 being a minute gap. In addition, evaporation of a lubricating oil 46 from a seal portion 55a can be prevented.

Figure 23:
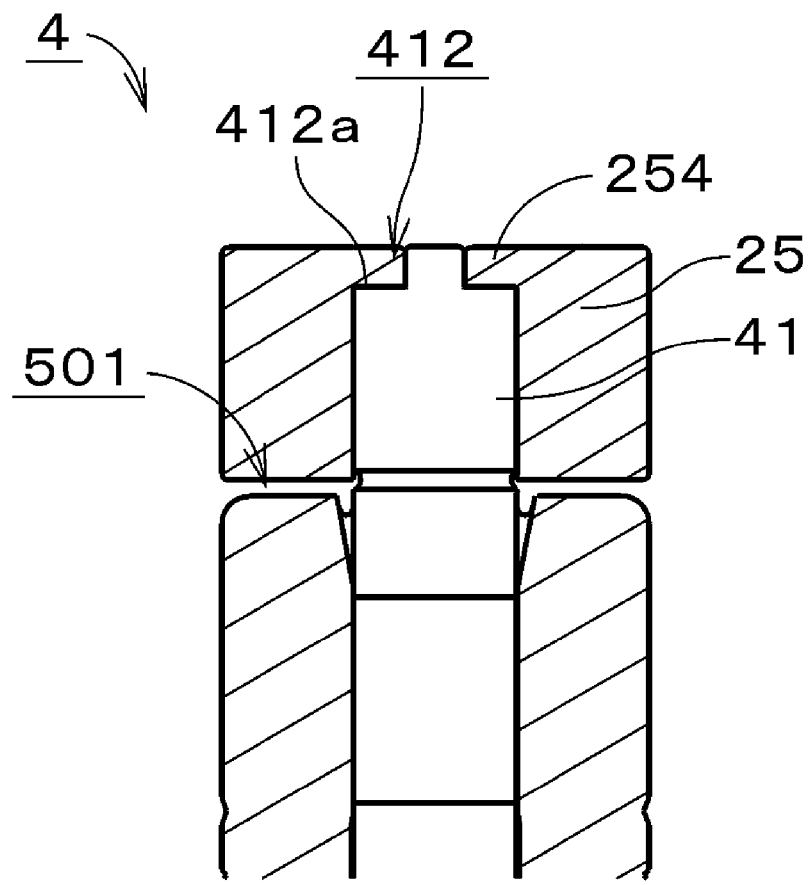
FIG. 23 is a cross-sectional view illustrating a bearing mechanism according to yet another modification of the first preferred embodiment.
Figure 24:
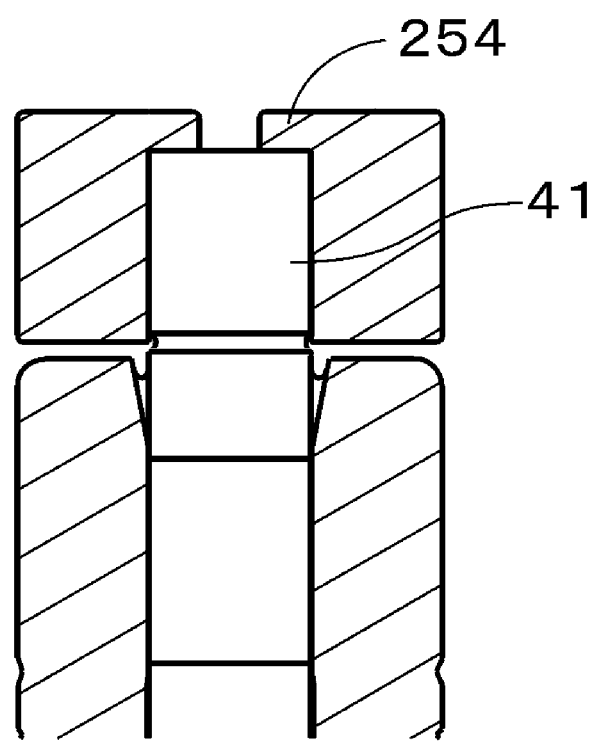
FIG. 24 is a cross-sectional view illustrating a bearing mechanism according to yet another modification of the first preferred embodiment.

FIG. 23 is a cross-sectional view illustrating a bearing mechanism 4 according to yet another modification of the first preferred embodiment. A bushing 25 includes an annular projecting portion 254 arranged to project radially inward from an inner circumferential surface thereof. An upper end portion of a shaft 41 includes a shoulder portion 412 defined by a decrease in the diameter thereof. The projecting portion 254 is arranged to be in axial contact with an upper surface 412a of the shoulder portion 412. The upper surface 412a is a surface having a normal oriented upward. Thus, a displacement of the axial position of the bushing 25 is prevented when a fan 1 is assembled, or more specifically, when an impeller 12 is indirectly fixed to an upper portion of the shaft 41 through the bushing 25, so that the width of a horizontal gap 501 can be easily set at a desired value. Referring to FIG. 24, in a further modification of the bearing mechanism 4, the shoulder portion 412 of the shaft 41 may be eliminated, with the projecting portion 254 arranged to be in axial contact with an upper surface of the shaft 41. Even in this case, a displacement of the axial position of the bushing 25 is prevented when the fan 1 is assembled so that the width of the horizontal gap 501 can be easily set at the desired value. This enables the labyrinth to be defined with high precision.

Figure 25:
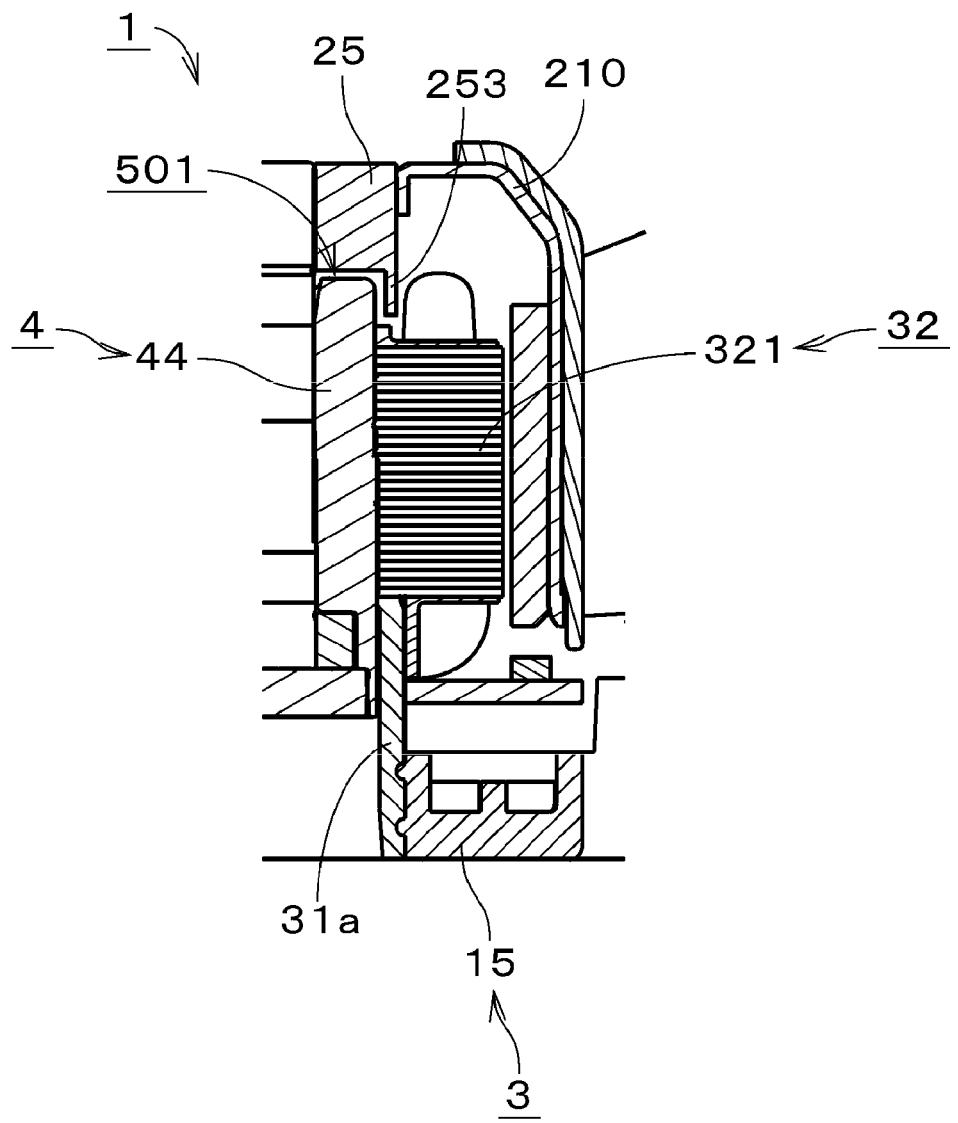
FIG. 25 is a cross-sectional view of a fan according to a modification of the first preferred embodiment.

FIG. 25 is a cross-sectional view illustrating a fan 1 according to a modification of the first preferred embodiment. A radially inner portion of a stator core 321 is fixed to an outer circumferential surface of a bearing portion 44. In a stationary portion 3, a cylindrical member 31a (hereinafter referred to as a "cylindrical portion 31a") is fixed to a central hole portion of a base portion 15, and an upper portion of the cylindrical portion 31a is arranged to be in axial contact with a lower portion of the stator core 321. As with the bushing 25 illustrated in FIG. 22, a bushing 25 includes an annular portion 253 arranged to extend downward outside of the bearing portion 44. The fan 1 according to the present modification of the first preferred embodiment is otherwise similar in structure to the fan 1 illustrated in FIG. 17.

When the fan 1 is assembled, a rotor holder 210 is press fitted to the bushing 25 of a bearing mechanism 4 from above the bushing 25. At this time, a lower end of the annular portion 253 is supported by a jig from below. Next, a stator 32 is attached to an outer circumference of the bearing portion 44, and a lower portion of the bearing portion 44 is inserted into the cylindrical portion 31a fixed to the base portion 15. In the case of the fan 1, a displacement of the axial position of the bushing 25 is prevented because the bushing 25 is supported from below when the rotor holder 210 is press fitted to the bushing 25. Thus, the axial width of a horizontal gap 501 can be easily set at a desired value, and the labyrinth can be defined with high precision.

Figure 26:
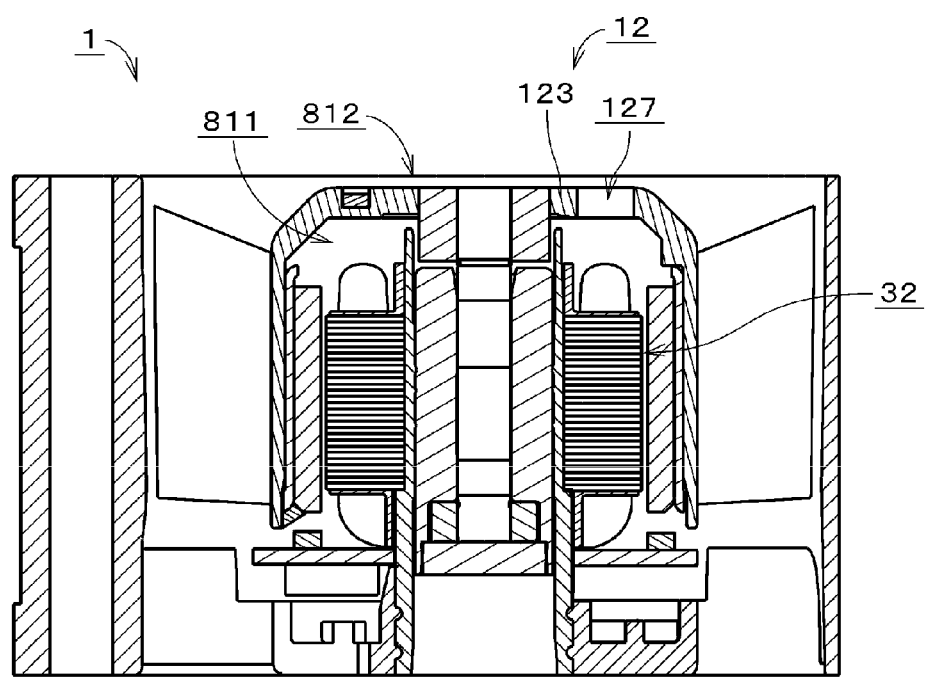
FIG. 26 is a cross-sectional view of a fan according to another modification of the first preferred embodiment.

FIG. 26 is a cross-sectional view illustrating a fan 1 according to yet another modification of the first preferred embodiment. A top face portion 123 of an impeller 12 includes a through hole 127 arranged to extend in the axial direction therethrough. The fan 1 according to the present modification of the first preferred embodiment is otherwise similar in structure to the fan 1 illustrated in FIG. 1. The through hole 127 is arranged to overlap with a stator 32 in the axial direction. The through hole 127 is arranged to bring a space 811 defined between the stator 32 and the top face portion 123 located above the stator 32 into communication with a space 812 above the impeller 12, that is, a space on an upstream side of the fan 1. While the fan 1 is driven, air currents are produced around the stator 32 to cool the stator 32. The through hole 127 thus functions as a channel to guide an air flow to the stator 32.

Figure 27:
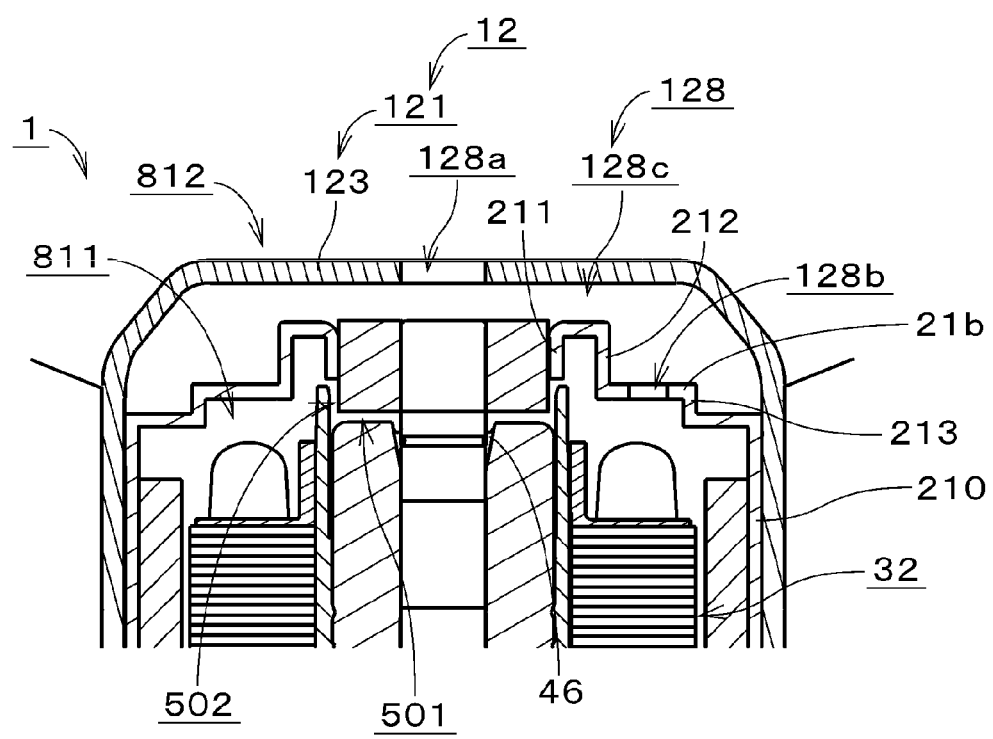
FIG. 27 is a cross-sectional view of a fan according to yet another modification of the first preferred embodiment.

FIG. 27 is a cross-sectional view illustrating a fan 1 according to yet another modification of the first preferred embodiment. In the fan 1, a rotor holder 210 arranged substantially in the shape of a covered cylinder is fixed to an inside of a cup 121 of an impeller 12. A top face portion 123 of the cup 121 includes a through hole 128a arranged to extend in the axial direction therethrough and defined in a center thereof. Hereinafter, the through hole 128a will be referred to as a "first through hole 128a". A top face portion 21b of the rotor holder 210 includes a first shoulder portion 212 arranged to be recessed downward and arranged radially outward of a burring portion 211, and a second shoulder portion 213 arranged to be recessed downward and arranged radially outward of the first shoulder portion 212. A through hole 128b is defined in the top face portion 21b between the first and second shoulder portions 212 and 213. Hereinafter, the through hole 128b will be referred to as a "second through hole 128b". The second through hole 128b is arranged at the same level as that of an upper portion of a vertical gap 502.

In the fan 1, the first through hole 128a, a space 128c defined between the top face portion 123 of the cup 121 and the top face portion 21b of the rotor holder 210, and the second through hole 128b are arranged to together define a channel 128 to bring a space 811 above a stator 32 into communication with a space 812 above the impeller 12. The stator 32 is thus cooled while the fan 1 is driven. Moreover, because the second through hole 128b, i.e., a downstream end portion of the channel 128, is arranged at the same level as that of the upper portion of the vertical gap 502, that is, because the second through hole 128b and the upper portion of the vertical gap 502 are arranged to overlap with each other in the radial direction, dust is prevented from entering into the vertical gap 502 and a horizontal gap 501. Note that the second through hole 128b may be arranged at a level lower than that of the upper portion of the vertical gap 502. Even in this case, dust is prevented from entering into the vertical gap 502 and the horizontal gap 501.

Figure 28:
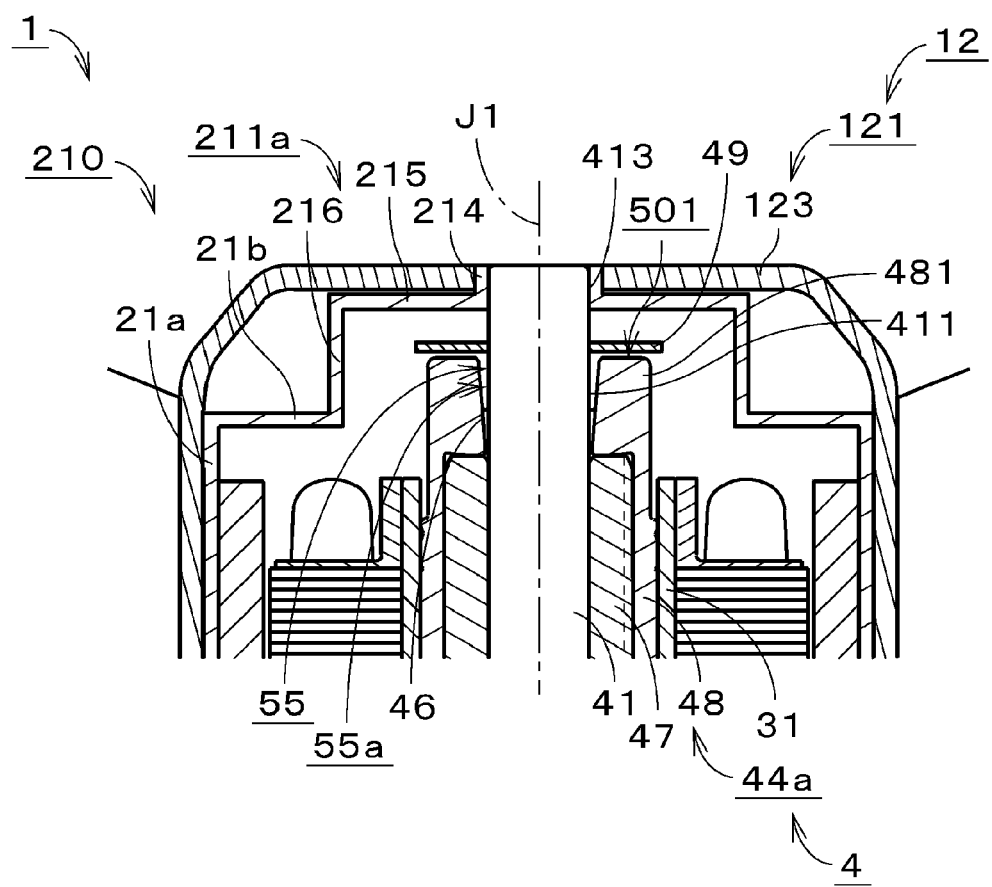
FIG. 28 is a cross-sectional view of a fan according to yet another modification of the first preferred embodiment.

FIG. 28 is a cross-sectional view illustrating a portion of a fan 1 according to yet another modification of the first preferred embodiment. A bearing mechanism 4 of the fan 1 is similar in structure to the bearing mechanism 4 illustrated in FIGS. 14 and 15. Accordingly, like members or portions are designated by like reference numerals, and redundant description is omitted. Referring to FIG. 28, an annular upper portion 481 of a bearing housing 48 is arranged above an upper end of a bearing support portion 31. An upper surface of the annular upper portion 481 is an upper surface of a bearing portion 44a as well. In addition, an upper surface of a sleeve 47 is also arranged above the upper end of the bearing support portion 31.

In the fan 1, a rotor holder 210 arranged substantially in the shape of a covered cylinder is fixed to an inside of a cup 121 of an impeller 12. The rotor holder 210 includes a cylindrical portion 21a, a top face portion 21b, and a holder projecting portion 211a. The holder projecting portion 211a includes a burring portion 214, a first portion 215, and a second portion 216. Each of the burring portion 214 and the second portion 216 is arranged substantially in the shape of a cylinder centered on a central axis J1. The first portion 215 is arranged substantially in the shape of an annular plate centered on the central axis J1. The first portion 215 is arranged to extend radially outward and perpendicularly to the central axis J1 from a lower end of the burring portion 214. The second portion 216 is arranged to extend downward from an outer edge portion of the first portion 215. The top face portion 21b is arranged substantially in the shape of an annular plate centered on the central axis J1. The top face portion 21b is arranged to extend radially outward and perpendicularly to the central axis J1 from a lower end of the second portion 216. The cylindrical portion 21a is arranged substantially in the shape of a cylinder centered on the central axis J1. The cylindrical portion 21a is arranged to extend downward from an outer edge portion of the top face portion 21b. The rotor holder 210 is made of a metal, and the cylindrical portion 21a functions as the yoke 21 illustrated in FIG. 1.

A top face portion 123 of the cup 121 includes a through hole arranged to extend in the axial direction therethrough and defined in a center thereof. An outer circumferential surface of the burring portion 214 of the holder projecting portion 211a is press fitted and thereby fixed to an inner circumferential surface of this through hole. Note that the impeller 12 and the rotor holder 210 may be joined to each other by an insert molding process. An inner circumferential surface of the burring portion 214 of the holder projecting portion 211a is press fitted and thereby fixed to an upper portion of a shaft 41 on an upper side of the bearing portion 44a. The shaft 41 includes an attachment surface 413 at an upper portion of an outer circumferential surface 411 thereof in a situation in which the rotor holder 210 and the impeller 12 have not yet been fixed to the shaft 41. The attachment surface 413 is a surface to which the top face portion 123 of the impeller 12 is to be indirectly attached through the rotor holder 210. The shaft 41 is inserted in the bearing portion 44a, and is arranged to rotate about the central axis J1 relative to the bearing portion 44a.

A seal portion 55a is defined around the shaft 41 on an upper side of a radial dynamic pressure bearing portion 68. A seal gap 55 includes the seal portion 55a, in which a surface of a lubricating oil 46 is defined. The bearing mechanism 4 further includes an annular member 49. The annular member 49 is arranged to spread perpendicularly to the central axis J1 above the seal portion 55a. The annular member 49 is arranged substantially in the shape of an annular plate centered on the central axis J1. An inner circumferential surface of the annular member 49 is fixed to the outer circumferential surface 411 of the shaft 41 axially between the seal portion 55a and the burring portion 214 of the holder projecting portion 211a. In other words, the annular member 49 is fixed to the shaft 41 axially between the seal portion 55a and the attachment surface 413. The annular member 49 is arranged to extend radially outward, with the central axis J1 as a center, beyond an opening of the seal gap 55. That is, the annular member 49 is arranged to cover the opening of the seal gap 55 from above. In other words, the annular member 49 is arranged to cover the opening of the seal gap 55 in a plan view. In FIG. 28, the annular member 49 is arranged to extend radially outward beyond an outer edge of the upper surface of the annular upper portion 481.

A minute horizontal gap 501 extending radially is defined between a lower surface of the annular member 49 and the upper surface of the bearing portion 44a. The seal gap 55 is arranged to be in communication with an exterior space through the horizontal gap 501. A minimum axial width of the horizontal gap 501 is arranged to be smaller than a maximum radial width of the opening of the seal gap 55. Thus, a labyrinth having a width smaller than the maximum radial width of the seal gap 55 is defined. Provision of the horizontal gap 501 contributes to preventing an air including a lubricating oil evaporated from the seal portion 55a from traveling out of the bearing mechanism 4. This contributes to reducing evaporation of the lubricating oil 46 out of the bearing mechanism 4. Furthermore, entry of an extraneous material, such as dust, into the seal portion 55a can be prevented.

Because of the annular member 49 fixed to the shaft 41, a reduction in the evaporation of the lubricating oil 46 out of the bearing mechanism 4 is achieved even in the situation in which the rotor holder 210 and the impeller 12 have not yet been attached to the shaft 41. Moreover, entry of an extraneous material, such as dust, into the seal portion 55a can be prevented as well. This makes it possible to assemble the fan 1 without a need to use an exceedingly clean facility. Furthermore, even while the bearing mechanism 4 is transported, dust is prevented from entering into the bearing mechanism 4. The same is true of fans 1 illustrated in FIGS. 29, 30, and 31.

Figure 29:
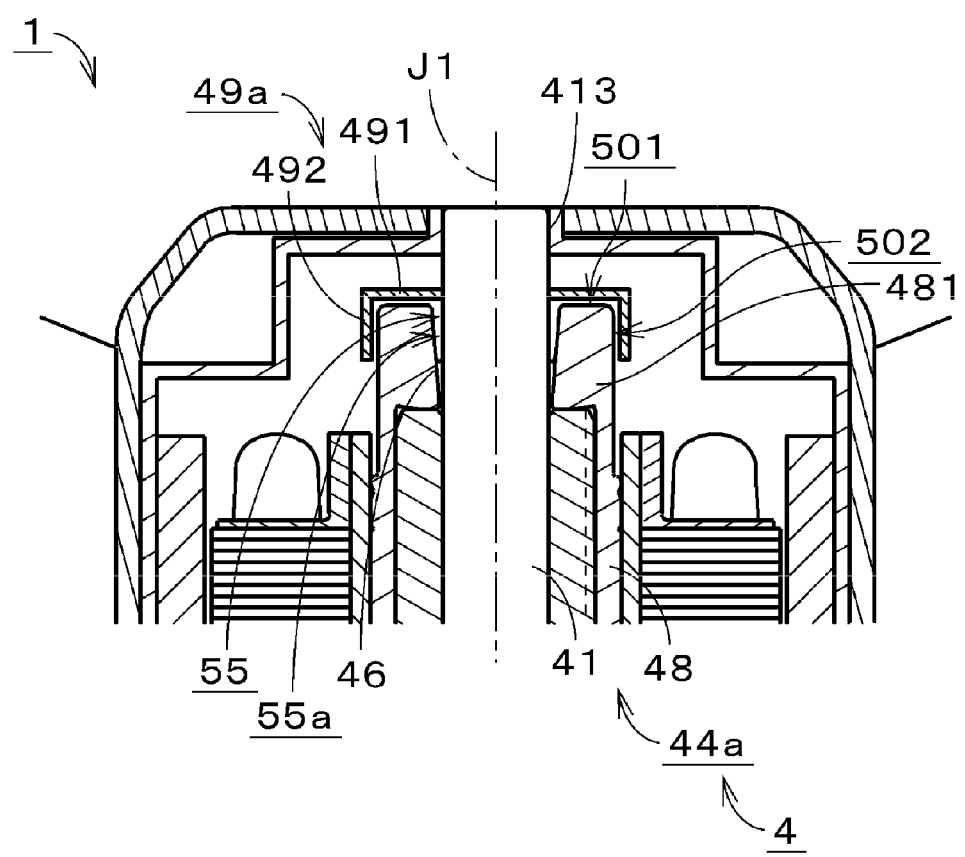
FIG. 29 is a cross-sectional view of a fan according to yet another modification of the first preferred embodiment.

FIG. 29 is a cross-sectional view illustrating a portion of a fan 1 according to yet another modification of the first preferred embodiment. The fan 1 according to the present modification of the first preferred embodiment is similar in structure to the fan 1 illustrated in FIG. 28. Accordingly, like members or portions are designated by like reference numerals, and redundant description is omitted. Referring to FIG. 29, in the fan 1, an annular member 49a arranged in an annular shape centered on a central axis J1 is provided in place of the annular member 49 illustrated in FIG. 28. The annular member 49a includes a top cover portion 491 and a tubular portion 492. The top cover portion 491 is arranged substantially in the shape of an annular plate centered on the central axis J1. The top cover portion 491 is fixed to a shaft 41 axially between a seal portion 55a and an attachment surface 413. The top cover portion 491 is arranged to extend radially outward beyond an outer circumferential surface of an annular upper portion 481. The tubular portion 492 is arranged substantially in the shape of a cylinder centered on the central axis J1. The tubular portion 492 is arranged to extend downward from an outer edge portion of the top cover portion 491. An inner circumferential surface of the tubular portion 492 is arranged radially opposite the outer circumferential surface of the annular upper portion 481 of a bearing housing 48, which defines a portion of a bearing portion 44a.

A minute horizontal gap 501 extending radially is defined between a lower surface of the top cover portion 491 and an upper surface of the bearing portion 44a. A minute vertical gap 502 extending in the axial direction and arranged in an annular shape centered on the central axis J1 is defined between the inner circumferential surface of the tubular portion 492 and the outer circumferential surface of the annular upper portion 481. An upper end portion of the vertical gap 502 is connected with an radially outer end portion of the horizontal gap 501. A seal gap 55 is arranged to be in communication with an exterior space through the horizontal gap 501 and the vertical gap 502. Each of a minimum axial width of the horizontal gap 501 and a minimum radial width of the vertical gap 502 is arranged to be smaller than a maximum radial width of an opening of the seal gap 55. Thus, a labyrinth having a width smaller than the maximum radial width of the seal gap 55 is defined. Provision of the vertical gap 502 in addition to the horizontal gap 501 contributes to more effectively preventing an air including a lubricating oil evaporated from the seal portion 55a from traveling out of a bearing mechanism 4. This contributes to further reducing evaporation of a lubricating oil 46 out of the bearing mechanism 4. Furthermore, entry of an extraneous material, such as dust, into the seal portion 55a can be prevented.

In the case where the vertical gap 502 is defined between the annular member 49a and the bearing portion 44a, the horizontal gap 501 may not necessarily be a minute gap. Even when only the vertical gap 502 is a minute gap, a reduction in the evaporation of the lubricating oil 46 out of the bearing mechanism 4 can be achieved, and also, entry of an extraneous material, such as dust, into the seal portion 55a can be prevented.

Figure 30:
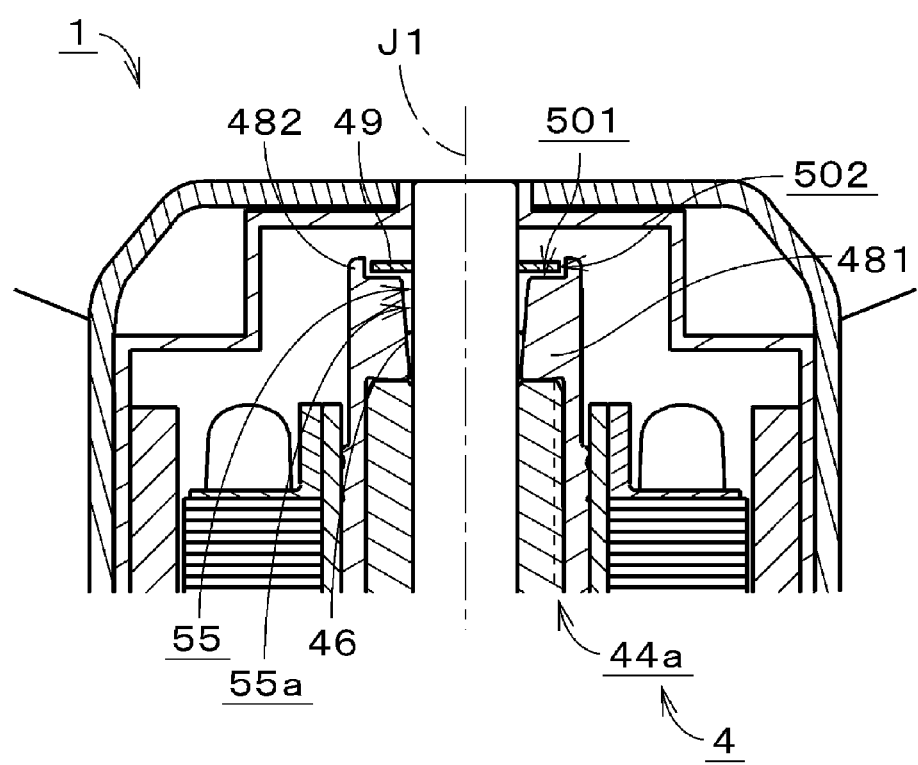
FIG. 30 is a cross-sectional view of a fan according to yet another modification of the first preferred embodiment.

FIG. 30 is a cross-sectional view illustrating a portion of a fan 1 according to yet another modification of the first preferred embodiment. The fan 1 according to the present modification of the first preferred embodiment is similar in structure to the fan 1 illustrated in FIG. 28. Accordingly, like members or portions are designated by like reference numerals, and redundant description is omitted. Referring to FIG. 30, a bearing portion 44a includes an annular projection portion 482 arranged to project upward from an outer edge portion of an upper surface of an annular upper portion 481. The annular projection portion 482 is arranged substantially in the shape of a cylinder centered on a central axis J1. An annular member 49 is arranged to extend radially outward, with the central ax is J1as a center, beyond an opening of a seal gap 55. An outer circumferential surface of the annular member 49 is arranged radially opposite an inner circumferential surface of the annular projection portion 482. Note that the annular projection portion 482 may be arranged to project upward from a position on a radially inner side of the outer edge portion of the upper surface of the annular upper portion 481.

A minute horizontal gap 501 extending radially is defined between a lower surface of the annular member 49 and an upper surface of the bearing portion 44a. A minute vertical gap 502 extending in the axial direction and arranged in an annular shape centered on the central axis J1 is defined between the outer circumferential surface of the annular member 49 and the inner circumferential surface of the annular projection portion 482. A lower end portion of the vertical gap 502 is connected with a radially outer end portion of the horizontal gap 501. The seal gap 55 is arranged to be in communication with an exterior space through the horizontal gap 501 and the vertical gap 502. Each of a minimum axial width of the horizontal gap 501 and a minimum radial width of the vertical gap 502 is arranged to be smaller than a maximum radial width of the opening of the seal gap 55. Thus, a labyrinth having a width smaller than the maximum radial width of the seal gap 55 is defined. Provision of the vertical gap 502 in addition to the horizontal gap 501 contributes to more effectively preventing an air including a lubricating oil evaporated from a seal portion 55a from traveling out of a bearing mechanism 4. This contributes to further reducing evaporation of a lubricating oil 46 out of the bearing mechanism 4. Furthermore, entry of an extraneous material, such as dust, into the seal portion 55a can be prevented.

In the case where the vertical gap 502 is defined between the annular member 49 and the bearing portion 44a, the horizontal gap 501 may not necessarily be a minute gap. Even when only the vertical gap 502 is a minute gap, a reduction in the evaporation of the lubricating oil 46 out of the bearing mechanism 4 can be achieved, and also, entry of an extraneous material, such as dust, into the seal portion 55a can be prevented.

Figure 31:
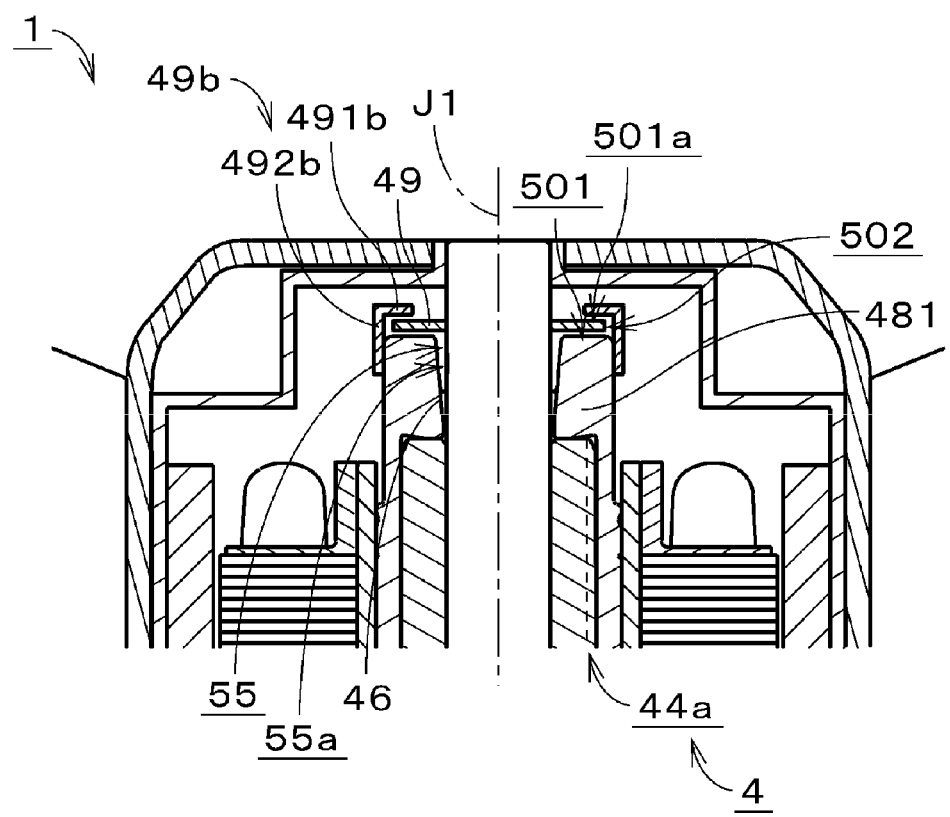
FIG. 31 is a cross-sectional view of a fan according to yet another modification of the first preferred embodiment.
Figure 3:
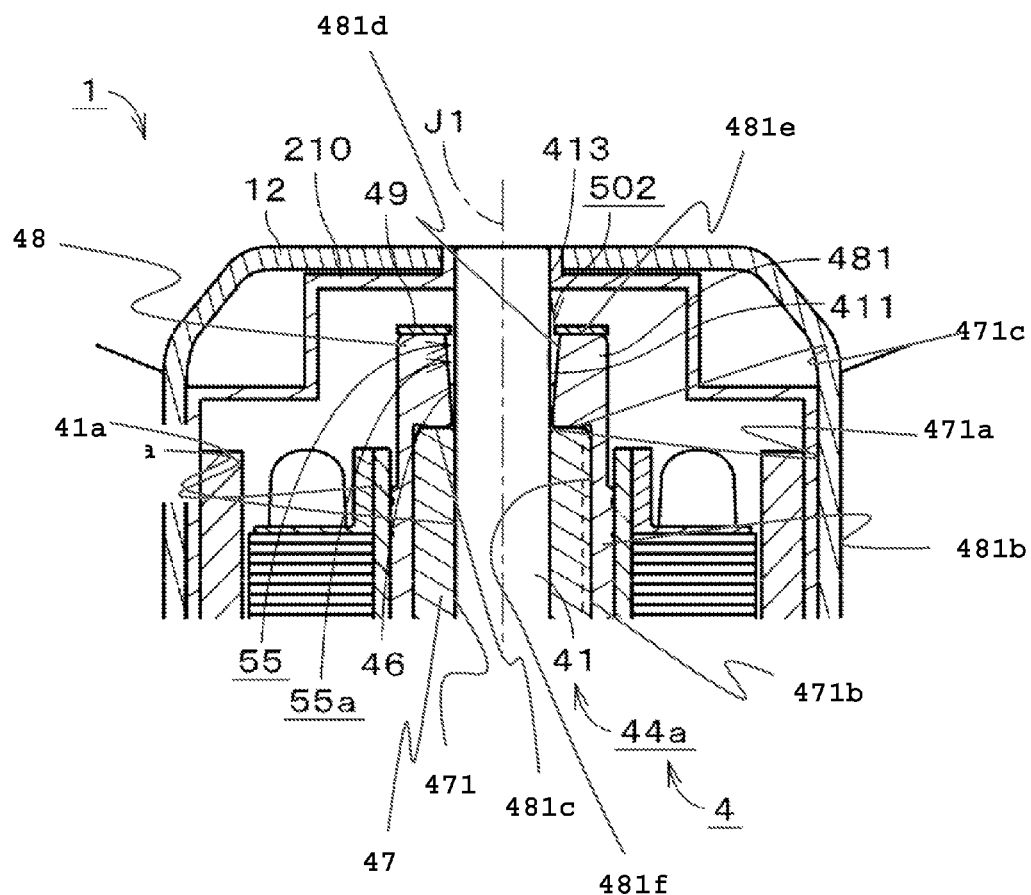

FIG. 31 is a cross-sectional view illustrating a portion of a fan 1 according to yet another modification of the first preferred embodiment. The fan 1 according to the present modification of the first preferred embodiment is similar in structure to the fan 1 illustrated in FIG. 28. Accordingly, like members or portions are designated by like reference numerals, and redundant description is omitted. Referring to FIG. 31, the fan 1 is provided with an annular member 49b arranged in an annular shape centered on a central axis J1 in addition to an annular member 49. The outside diameter of the annular member 49 is arranged to be smaller than the outside diameter of an upper surface of an annular upper portion 481. The annular member 49b includes a top cover portion 491b and a tubular portion 492b. The top cover portion 491b is arranged substantially in the shape of an annular plate centered on the central axis J1. The tubular portion 492b is arranged substantially in the shape of a cylinder centered on the central axis J1. The tubular portion 492b is arranged to extend downward from an outer edge portion of the top cover portion 491b. An inner circumferential surface of the tubular portion 492b is fixed to an outer circumferential surface of the annular upper portion 481. The inner circumferential surface of the tubular portion 492b is arranged radially opposite an outer circumferential surface of the annular member 49. The top cover portion 491b is arranged above the annular member 49. A lower surface of the top cover portion 491b is arranged axially opposite an upper surface of the annular member 49.

A minute horizontal gap 501 extending radially is defined between a lower surface of the annular member 49 and an upper surface of a bearing portion 44a. A minute vertical gap 502 extending in the axial direction and arranged in an annular shape centered on the central axis J1 is defined between the outer circumferential surface of the annular member 49 and the inner circumferential surface of the tubular portion 492b. A minute horizontal gap 501a extending radially is defined between the upper surface of the annular member 49 and the lower surface of the top cover portion 491b. A lower end portion of the vertical gap 502 is connected with a radially outer end portion of the horizontal gap 501. An upper end portion of the vertical gap 502 is connected with a radially outer end portion of the horizontal gap 501a. A seal gap 55 is arranged to be in communication with an exterior space through the horizontal gap 501, the vertical gap 502, and the horizontal gap 501a.

Each of a minimum axial width of the horizontal gap 501, a minimum axial width of the horizontal gap 501a, and a minimum radial width of the vertical gap 502 is arranged to be smaller than a maximum radial width of an opening of the seal gap 55. Thus, a labyrinth having a width smaller than the maximum radial width of the seal gap 55 is defined. Provision of the vertical gap 502 and the horizontal gap 501a in addition to the horizontal gap 501 contributes to more effectively preventing an air including a lubricating oil evaporated from a seal portion 55a from traveling out of a bearing mechanism 4. This contributes to further reducing evaporation of a lubricating oil 46 out of the bearing mechanism 4. Furthermore, entry of an extraneous material, such as dust, into the seal portion 55a can be prevented.

Note that each of the horizontal gap 501 and the vertical gap 502 may not necessarily be a minute gap. Even when only the horizontal gap 501a is a minute gap, a reduction in the evaporation of the lubricating oil 46 out of the bearing mechanism 4 can be achieved, and also, entry of an extraneous material, such as dust, into the seal portion 55a can be prevented.

FIG. 32 is a cross-sectional view illustrating a portion of a fan 1 according to yet another modification of the first preferred embodiment. The fan 1 according to the present modification of the first preferred embodiment is similar in structure to the fan 1 illustrated in FIG. 28. Accordingly, like members or portions are designated by like reference numerals, and redundant description is omitted. Referring to FIG. 32, an annular member 49 is fixed to an upper portion of a bearing portion 44a. In the present modification of the first preferred embodiment, the annular member 49 is fixed to an upper surface of an annular upper portion 481. The annular member 49 is arranged substantially in the shape of an annular plate centered on a central axis J1. The inside diameter of the annular member 49 is arranged to be slightly greater than the outside diameter of a shaft 41. An inner circumferential surface of the annular member 49 is arranged radially opposite an outer circumferential surface 411 of the shaft 41 axially between a seal portion 55a and an attachment surface 413.

A minute vertical gap 502 extending in the axial direction and arranged in an annular shape centered on the central axis J1 is defined between the inner circumferential surface of the annular member 49 and the outer circumferential surface 411 of the shaft 41. A seal gap 55 is arranged to be in communication with an exterior space through the vertical gap 502. A minimum radial width of the vertical gap 502 is arranged to be smaller than a maximum radial width of an opening of the seal gap 55. That is, the annular member 49 is arranged to cover a portion of the opening of the seal gap 55 from above. In other words, the annular member 49 is arranged to cover a portion of the opening of the seal gap 55 in a plan view. Thus, a labyrinth having a width smaller than the maximum radial width of the seal gap 55 is defined above the seal portion 55a. Provision of the vertical gap 502 contributes to preventing an air including a lubricating oil evaporated from the seal portion 55a from traveling out of a bearing mechanism 4. This contributes to reducing evaporation of a lubricating oil 46 out of the bearing mechanism 4. Furthermore, entry of an extraneous material, such as dust, into the seal portion 55a can be prevented. As illustrated in FIG. 32, the sleeve 47 has an inner circumferential surface 471, an outer circumferential surface 471b and an upper surface 471c. The bearing portion also includes a bearing housing 48 having an annular upper portion 481 and a circumferential body 481b. The annular upper portion 481 has a lower surface 481c, an inner surface 481d, and an upper surface 481e. The circumferential body 481b has an inner surface 481f. The annular member 49 is radially opposed to an outer circumferential surface 41a of the shaft.

Because of the annular member 49 fixed to the bearing portion 44a, a reduction in the evaporation of the lubricating oil 46 out of the bearing mechanism 4 is achieved even in a situation in which a rotor holder 210 and an impeller 12 have not yet been attached to the shaft 41. Moreover, entry of an extraneous material, such as dust, into the seal portion 55a can be prevented as well. The same is true of each of fans 1 illustrated in FIGS. 33 and 34.

Figure 33:
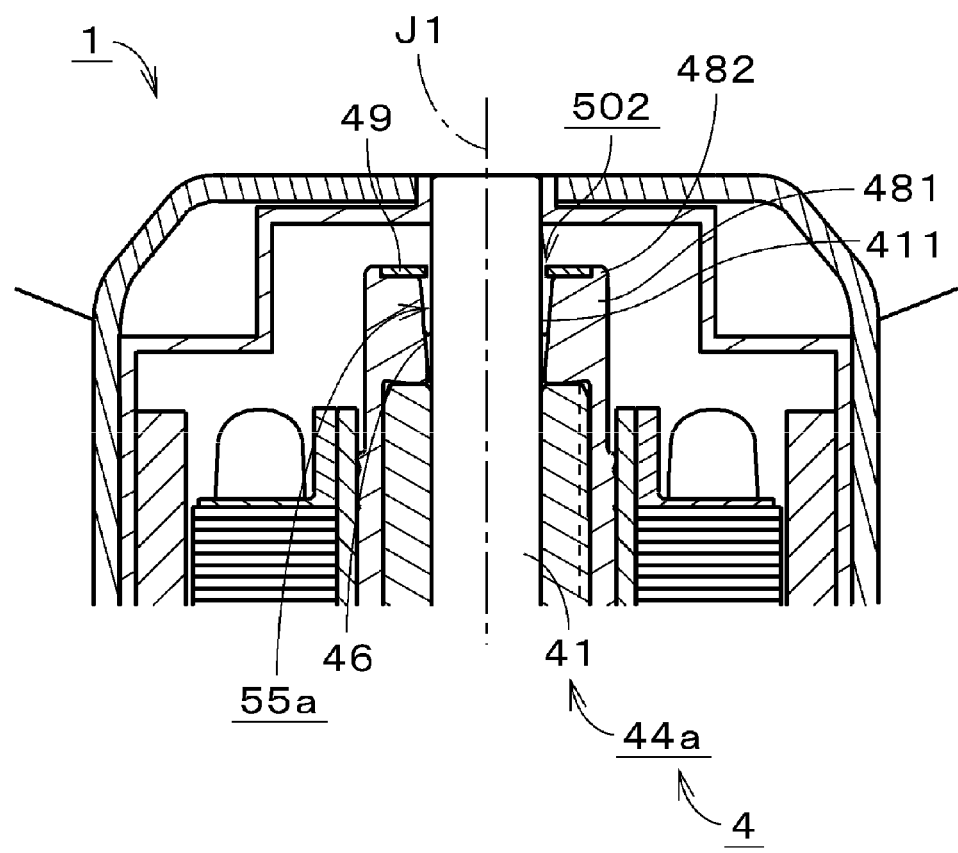
FIG. 33 is a cross-sectional view of a fan according to yet another modification of the first preferred embodiment.

FIG. 33 is a cross-sectional view illustrating a portion of a fan 1 according to yet another modification of the first preferred embodiment. The fan 1 according to the present modification of the first preferred embodiment is similar in structure to the fan 1 illustrated in FIG. 32. Accordingly, like members or portions are designated by like reference numerals, and redundant description is omitted. Referring to FIG. 33, a bearing portion 44a includes an annular projection portion 482 arranged to project upward from an outer edge portion of an upper surface of an annular upper portion 481. The annular projection portion 482 is arranged substantially in the shape of a cylinder centered on a central axis J1. An annular member 49 is arranged on the upper surface of the annular upper portion 481 of the bearing portion 44a on a radially inner side of the annular projection portion 482. Although the annular member 49 is fixed to the upper surface of the annular upper portion 481 of the bearing portion 44a in the present modification of the first preferred embodiment, the annular member 49 may be fixed to an inner circumferential surface of the annular projection portion 482. An outer circumferential surface of the annular member 49 is arranged to be in contact with the inner circumferential surface of the annular projection portion 482 throughout an entire circumference thereof. Note that the annular projection portion 482 may be arranged to project upward from a position on a radially inner side of the outer edge portion of the upper surface of the annular upper portion 481. Also note that only a portion or portions of the outer circumferential surface of the annular member 49 may be arranged to be in contact with the inner circumferential surface of the annular projection portion 482.

A vertical gap 502 similar to the vertical gap 502 illustrated in FIG. 32 is defined between an inner circumferential surface of the annular member 49 and an outer circumferential surface 411 of a shaft 41. Provision of the vertical gap 502 contributes to preventing an air including a lubricating oil evaporated from a seal portion 55a from traveling out of a bearing mechanism 4. This contributes to reducing evaporation of a lubricating oil 46 out of the bearing mechanism 4. Furthermore, entry of an extraneous material, such as dust, into the seal portion 55a can be prevented. Since the outer circumferential surface of the annular member 49 is arranged to be in contact with the inner circumferential surface of the annular projection portion 482, positioning of the annular member 49 can be easily accomplished when the annular member 49 is attached to the bearing portion 44a.

Figure 34:
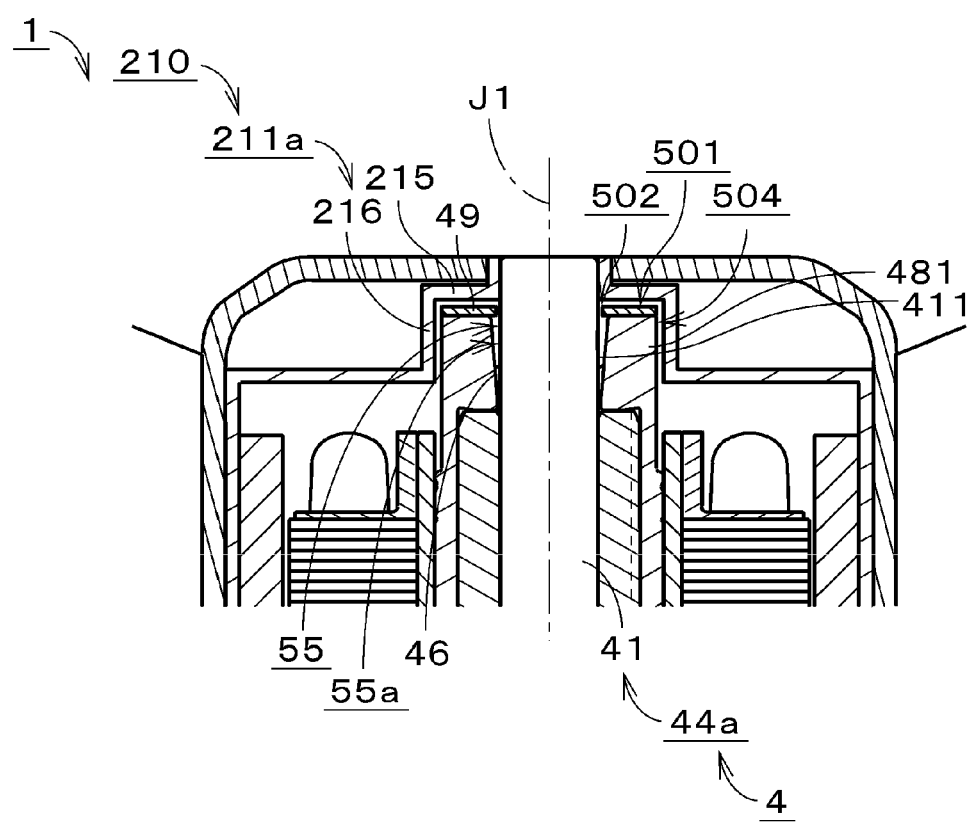
FIG. 34 is a cross-sectional view of a fan according to yet another modification of the first preferred embodiment.
Figure 3:
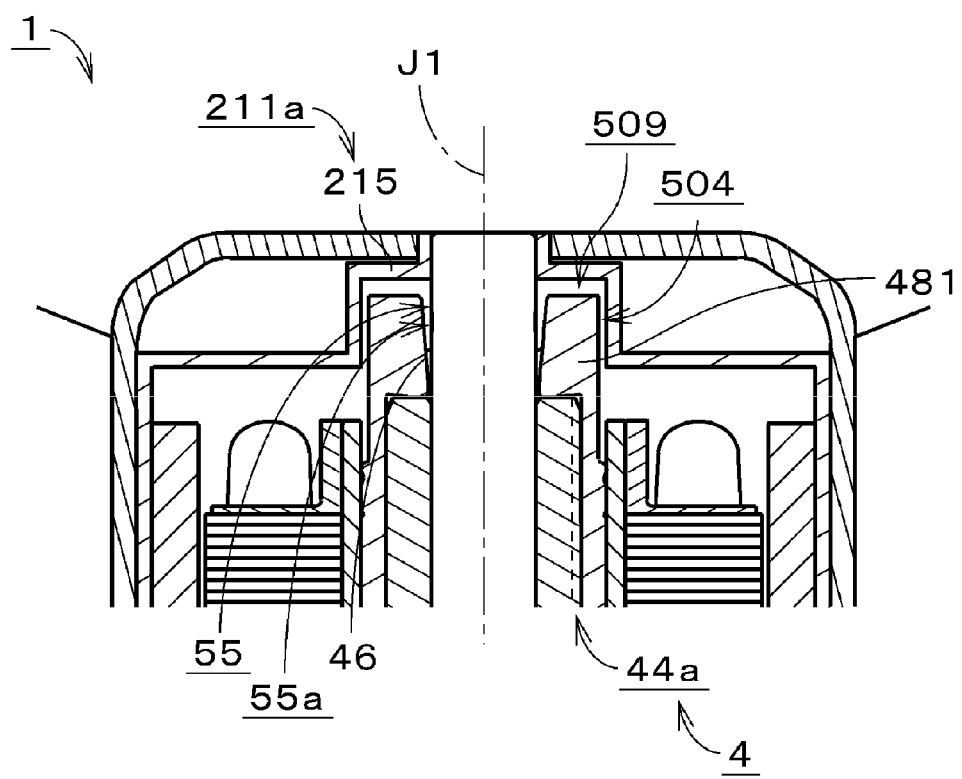

FIG. 34 is a cross-sectional view illustrating a portion of a fan 1 according to yet another modification of the first preferred embodiment. The fan 1 according to the present modification of the first preferred embodiment is similar in structure to the fan 1 illustrated in FIG. 32. Accordingly, like members or portions are designated by like reference numerals, and redundant description is omitted. Referring to FIG. 34, a first portion 215 of a holder projecting portion 211a of a rotor holder 210 is arranged above an annular member 49. A lower surface of the first portion 215 is arranged axially opposite an upper surface of the annular member 49. A second portion 216 of the holder projecting portion 211a is arranged radially outside an annular upper portion 481 of a bearing portion 44a. An inner circumferential surface of the second portion 216 is arranged radially opposite each of an outer circumferential surface of the annular member 49 and an outer circumferential surface of the annular upper portion 481.

A minute vertical gap 502 extending in the axial direction and arranged in an annular shape centered on a central axis J1 is defined between an inner circumferential surface of the annular member 49 and an outer circumferential surface 411 of a shaft 41. A minute horizontal gap 501 spreading perpendicularly to the central axis J1 is defined between the lower surface of the first portion 215 and the upper surface of the annular member 49. A minute vertical gap 504 extending in the axial direction and arranged in an annular shape centered on the central axis J1 is defined between the inner circumferential surface of the second portion 216 and a combination of the outer circumferential surface of the annular member 49 and the outer circumferential surface of the annular upper portion 481. Although the minute vertical gap 504 is defined between the inner circumferential surface of the second portion 216 and the combination of the outer circumferential surface of the annular member 49 and the outer circumferential surface of the annular upper portion 481 in the present modification of the first preferred embodiment, the minute vertical gap 504 may be defined only between the inner circumferential surface of the second portion 216 and the outer circumferential surface of the annular upper portion 481. In other words, a portion of the vertical gap 504 which is defined between the inner circumferential surface of the second portion 216 and the outer circumferential surface of the annular member 49 may not necessarily be a minute gap. An upper end portion of the vertical gap 502 is connected with a radially inner end portion of the horizontal gap 501. An upper end portion of the vertical gap 504 is connected with a radially outer end portion of the horizontal gap 501. A seal gap 55 is arranged to be in communication with an exterior space through the vertical gap 502, the horizontal gap 501, and the vertical gap 504.

Each of a minimum radial width of the vertical gap 502, a minimum radial width of the vertical gap 504, and a minimum axial width of the horizontal gap 501 is arranged to be smaller than a maximum radial width of an opening of the seal gap 55. Thus, a labyrinth having a width smaller than the maximum radial width of the seal gap 55 is defined. Provision of the horizontal gap 501 and the vertical gap 504 in addition to the vertical gap 502 contributes to more effectively preventing an air including a lubricating oil evaporated from a seal portion 55a from traveling out of a bearing mechanism 4. This contributes to further reducing evaporation of a lubricating oil 46 out of the bearing mechanism 4. Furthermore, entry of an extraneous material, such as dust, into the seal portion 55a can be prevented.

FIG. 35 is a cross-sectional view illustrating a portion of a fan 1 according to yet another modification of the first preferred embodiment. The fan 1 according to the present modification of the first preferred embodiment is similar in structure to the fan 1 illustrated in FIG. 34. Accordingly, like members or portions are designated by like reference numerals, and redundant description is omitted. Referring to FIG. 35, in the fan 1, the annular member 49 is not provided, and a lower surface of a first portion 215 of a holder projecting portion 211a is arranged axially opposite an upper surface of an annular upper portion 481 of a bearing portion 44a.

A horizontal gap 509 extending radially is defined between the lower surface of the first portion 215 and the upper surface of the annular upper portion 481. A radially outer end portion of the horizontal gap 509 is connected with an upper end portion of a vertical gap 504. A seal gap 55 is arranged to be in communication with an exterior space through the horizontal gap 509 and the vertical gap 504.

A minimum radial width of the vertical gap 504 is arranged to be smaller than a maximum radial width of an opening of the seal gap 55. Thus, a labyrinth having a width smaller than the maximum radial width of the seal gap 55 is defined radially outward of the seal gap 55. Provision of the vertical gap 504 contributes to more effectively preventing an air including a lubricating oil evaporated from a seal portion 55a from traveling out of a bearing mechanism 4. This contributes to further reducing evaporation of a lubricating oil 46 out of the bearing mechanism 4. Furthermore, entry of an extraneous material, such as dust, into the seal portion 55a can be prevented.

Figure 36:
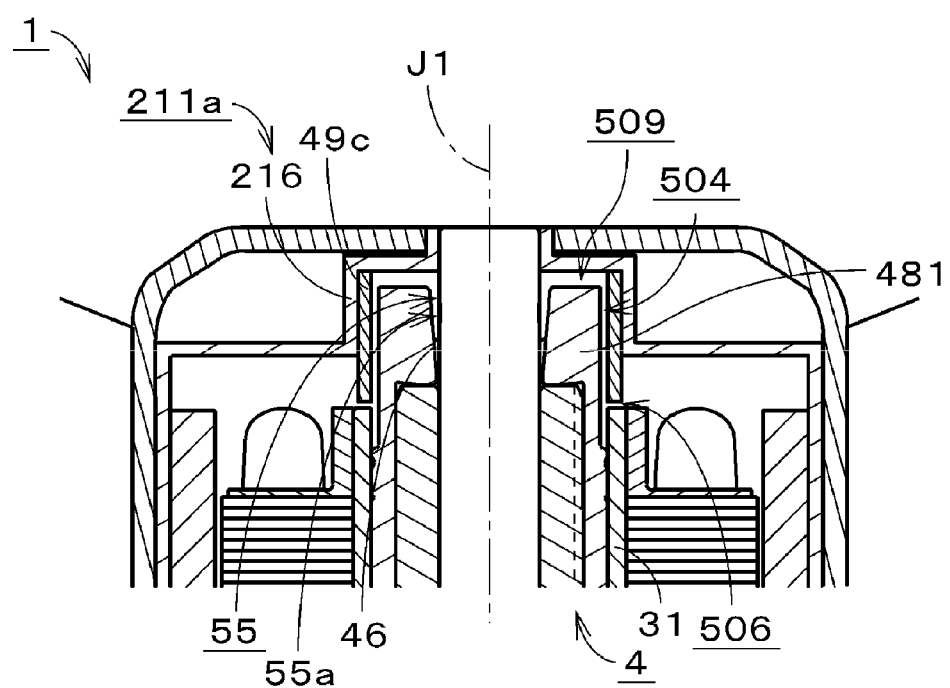
FIG. 36 is a cross-sectional view of a fan according to yet another modification of the first preferred embodiment.

FIG. 36 is a cross-sectional view illustrating a portion of a fan 1 according to yet another modification of the first preferred embodiment. The fan 1 according to the present modification of the first preferred embodiment is similar in structure to the fan 1 illustrated in FIG. 35. Accordingly, like members or portions are designated by like reference numerals, and redundant description is omitted. Referring to FIG. 36, an annular member 49c is fixed to a second portion 216 of a holder projecting portion 211a. The annular member 49c is arranged substantially in the shape of a cylinder centered on a central axis J1. An outer circumferential surface of the annular member 49c is fixed to an inner circumferential surface of the second portion 216. A lower end of the annular member 49c is arranged in the vicinity of an upper end of a bearing support portion 31. An inner circumferential surface of the annular member 49c is arranged radially opposite an outer circumferential surface of an annular upper portion 481. A lower surface of the annular member 49c is arranged axially opposite an upper surface of the bearing support portion 31.

A minute vertical gap 504 extending in the axial direction and arranged in an annular shape centered on the central axis J1 is defined between the inner circumferential surface of the annular member 49c and the outer circumferential surface of the annular upper portion 481. A minute horizontal gap 506 extending radially is defined between the lower surface of the annular member 49c and the upper surface of the bearing support portion 31. An upper end portion of the vertical gap 504 is connected with a radially outer end portion of a horizontal gap 509. A lower end portion of the vertical gap 504 is connected with a radially inner end portion of the horizontal gap 506. A seal gap 55 is arranged to be in communication with an exterior space through the horizontal gap 509, the vertical gap 504, and the horizontal gap 506.

Each of a minimum radial width of the vertical gap 504 and a minimum axial width of the horizontal gap 506 is arranged to be smaller than a maximum radial width of an opening of the seal gap 55. Thus, a labyrinth having a width smaller than the maximum radial width of the seal gap 55 is defined radially outward of the seal gap 55. Provision of the horizontal gap 506 in addition to the vertical gap 504 contributes to more effectively preventing an air including a lubricating oil evaporated from a seal portion 55a from traveling out of a bearing mechanism 4. This contributes to further reducing evaporation of a lubricating oil 46 out of the bearing mechanism 4. Furthermore, entry of an extraneous material, such as dust, into the seal portion 55a can be prevented.

Figure 37:
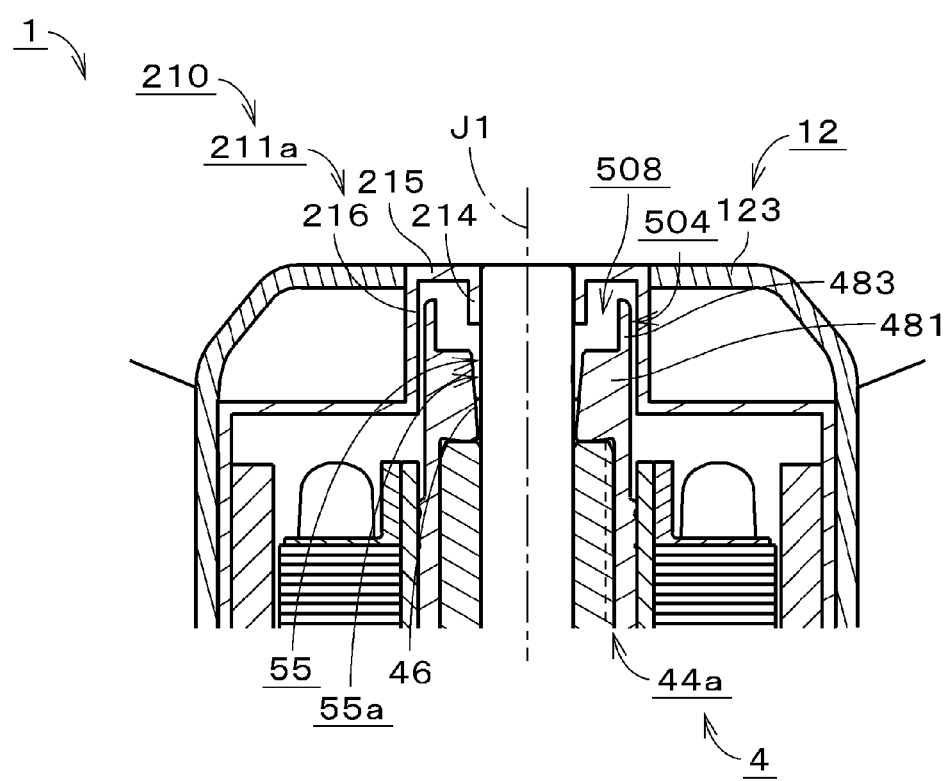
FIG. 37 is a cross-sectional view of a fan according to yet another modification of the first preferred embodiment.

FIG. 37 is a cross-sectional view illustrating a portion of a fan 1 according to yet another modification of the first preferred embodiment. The fan 1 according to the present modification of the first preferred embodiment is similar in structure to the fan 1 illustrated in FIG. 35. Accordingly, like members or portions are designated by like reference numerals, and redundant description is omitted. Referring to FIG. 37, a holder projecting portion 211a of a rotor holder 210 includes a burring portion 214 arranged to extend downward from a radially inner end portion of a first portion 215. A bearing portion 44a includes an annular outer wall portion 483 arranged to extend upward from an outer edge portion of an upper surface of an annular upper portion 481. The annular outer wall portion 483 is arranged substantially in the shape of a cylinder centered on a central axis J1. An outer circumferential surface of the annular outer wall portion 483 is arranged radially opposite an inner circumferential surface of a second portion 216 of the holder projecting portion 211a.

A minute vertical gap 504 extending in the axial direction and arranged in an annular shape centered on the central axis J1 is defined between the outer circumferential surface of the annular outer wall portion 483 and the inner circumferential surface of the second portion 216. A space 508 above the annular upper portion 481 is connected with an upper end portion of the vertical gap 504. A seal gap 55 is arranged to be in communication with an exterior space through the space 508 and the vertical gap 504.

A minimum radial width of the vertical gap 504 is arranged to be smaller than a maximum radial width of an opening of the seal gap 55. Thus, a labyrinth having a width smaller than the maximum radial width of the seal gap 55 is defined radially outward of the seal gap 55. Provision of the vertical gap 504 contributes to preventing an air including a lubricating oil evaporated from a seal portion 55a from traveling out of a bearing mechanism 4. This contributes to reducing evaporation of a lubricating oil 46 out of the bearing mechanism 4. Furthermore, entry of an extraneous material, such as dust, into the seal portion 55a can be prevented.

Figure 38:
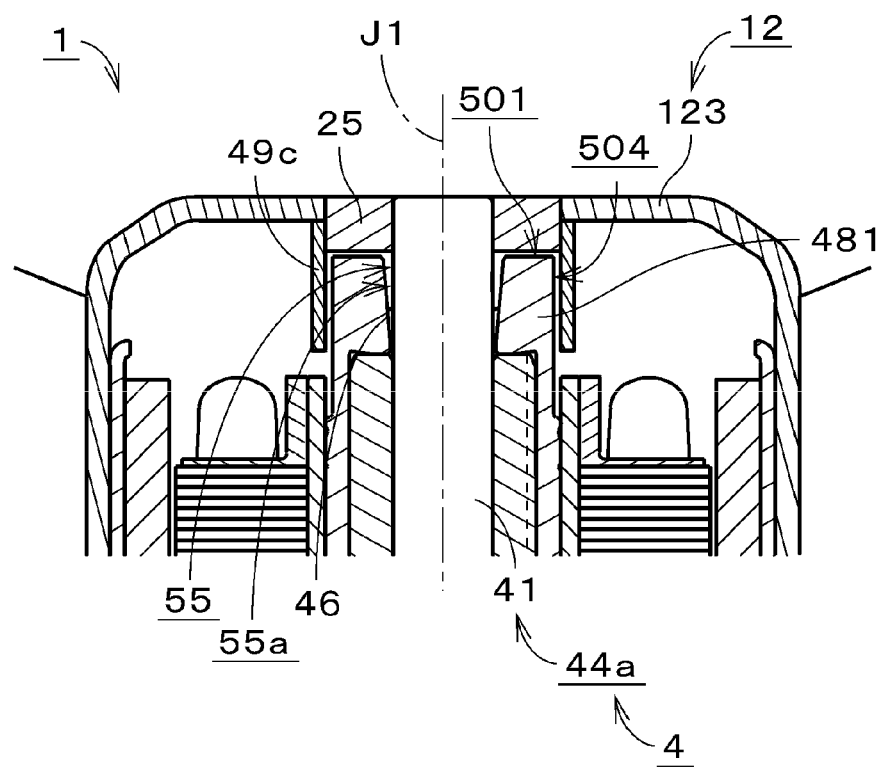
FIG. 38 is a cross-sectional view of a fan according to yet another modification of the first preferred embodiment.

FIG. 38 is a cross-sectional view illustrating a portion of a fan 1 according to yet another modification of the first preferred embodiment. The fan 1 according to the present modification of the first preferred embodiment is similar in structure to the fan 1 illustrated in FIG. 36. Accordingly, like members or portions are designated by like reference numerals, and redundant description is omitted. Referring to FIG. 38, an impeller 12 is fixed to a shaft 41 through a bushing 25. The bushing 25 is arranged substantially in the shape of a column centered on a central axis J1. The outside diameter of the bushing 25 is arranged to be slightly greater than the outside diameter of an annular upper portion 481. An inner circumferential surface of a top face portion 123 of the impeller 12 is fixed to an outer circumferential surface of the bushing 25. A lower surface of the bushing 25 is arranged axially opposite an upper surface of the annular upper portion 481 of a bearing portion 44a. An annular member 49c is also fixed to the outer circumferential surface of the bushing 25. The annular member 49c is arranged substantially in the shape of a cylinder centered on the central axis J1. An inner circumferential surface of the annular member 49c is fixed to the outer circumferential surface of the bushing 25 below the top face portion 123 of the impeller 12. The inner circumferential surface of the annular member 49c is arranged radially opposite an outer circumferential surface of the annular upper portion 481.

A minute horizontal gap 501 extending radially is defined between the lower surface of the bushing 25 and the upper surface of the annular upper portion 481. A minute vertical gap 504 extending in the axial direction and arranged in an annular shape centered on the central axis J1 is defined between the inner circumferential surface of the annular member 49c and the outer circumferential surface of the annular upper portion 481. An upper end portion of the vertical gap 504 is connected with a radially outer end portion of the horizontal gap 501. A seal gap 55 is arranged to be in communication with an exterior space through the horizontal gap 501 and the vertical gap 504.

Each of a minimum axial width of the horizontal gap 501 and a minimum radial width of the vertical gap 504 is arranged to be smaller than a maximum radial width of an opening of the seal gap 55. Thus, a labyrinth having a width smaller than the maximum radial width of the seal gap 55 is defined. Provision of the horizontal gap 501 and the vertical gap 504 contributes to preventing an air including a lubricating oil evaporated from a seal portion 55a from traveling out of a bearing mechanism 4. This contributes to reducing evaporation of a lubricating oil 46 out of the bearing mechanism 4. Furthermore, entry of an extraneous material, such as dust, into the seal portion 55a can be prevented.

Figure 39:
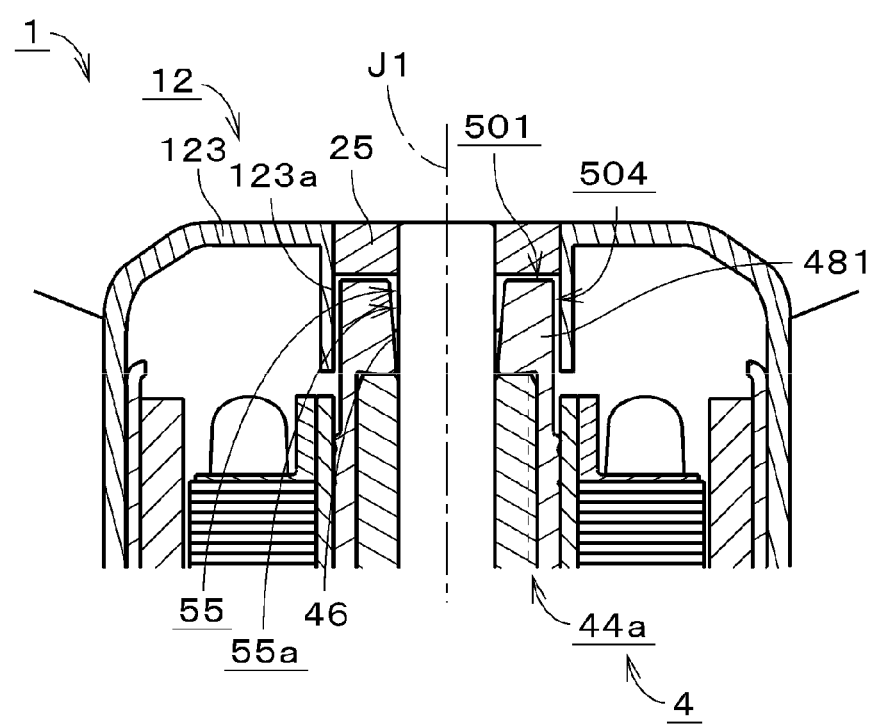
FIG. 39 is a cross-sectional view of a fan according to yet another modification of the first preferred embodiment.

FIG. 39 is a cross-sectional view illustrating a portion of a fan 1 according to yet another modification of the first preferred embodiment. The fan 1 according to the present modification of the first preferred embodiment is similar in structure to the fan 1 illustrated in FIG. 38. Accordingly, like members or portions are designated by like reference numerals, and redundant description is omitted. Referring to FIG. 39, an impeller 12 includes an inner tubular portion 123a arranged substantially in the shape of a cylinder centered on a central axis J1. The inner tubular portion 123a is arranged to extend downward from a radially inner end portion of a top face portion 123. An upper portion of an inner circumferential surface of the inner tubular portion 123a is fixed to an outer circumferential surface of a bushing 25. A lower portion of the inner circumferential surface of the inner tubular portion 123a is arranged radially opposite an outer circumferential surface of an annular upper portion 481 of a bearing portion 44a.

A minute vertical gap 504 extending in the axial direction and arranged in an annular shape centered on the central axis J1 is defined between the inner circumferential surface of the inner tubular portion 123a and the outer circumferential surface of the annular upper portion 481. An upper end portion of the vertical gap 504 is connected with a radially outer end portion of a horizontal gap 501. A seal gap 55 is arranged to be in communication with an exterior space through the horizontal gap 501 and the vertical gap 504.

Each of a minimum axial width of the horizontal gap 501 and a minimum radial width of the vertical gap 504 is arranged to be smaller than a maximum radial width of an opening of the seal gap 55. Thus, a labyrinth having a width smaller than the maximum radial width of the seal gap 55 is defined. Provision of the horizontal gap 501 and the vertical gap 504 contributes to preventing an air including a lubricating oil evaporated from a seal portion 55a from traveling out of a bearing mechanism 4. This contributes to reducing evaporation of a lubricating oil 46 out of the bearing mechanism 4. Furthermore, entry of an extraneous material, such as dust, into the seal portion 55a can be prevented.

While preferred embodiments of the present invention have been described above, it will be understood that the present invention is not limited to the above-described preferred embodiments, and that a variety of modifications are possible.

While a very small width of each of the vertical gaps 502 and 504 can be easily achieved by machine work, a very small width of each of the horizontal gaps 501, 501a, and 506 additionally requires a high precision in assembling the bearing mechanism 4. Therefore, each of the horizontal gaps 501, 501a, and 506 may have a width greater than the maximum width of the opening of the seal gap 55 as long as the width is very small. The bushing 25 may be defined by a sintered member shaped by press working, for example. In a modification of the bearing mechanism 4 illustrated in FIG. 23, it may be so arranged that the projecting portion 254 is eliminated from the bushing 25, the shaft 41 includes a shoulder portion defined at an axial position corresponding to that of the lower surface of the bushing 25, and the lower surface of the bushing 25 is arranged to be in axial contact with the shoulder portion. In a modification of the bearing mechanism 4 illustrated in FIG. 2, the bushing 25 may be arranged to have an outside diameter substantially equal to the outside diameter of the bearing portion 44. In this case, an inner circumferential surface of the upper portion of the bearing support portion 31 is arranged radially outward of an inner circumferential surface of a remaining portion of the bearing support portion 31, so that the vertical gap 502 is defined between the inner circumferential surface of the upper portion of the bearing support portion 31 and the outer circumferential surface of the bushing 25.

In a modification of the bearing mechanism 4 illustrated in FIG. 14, the bushing 25 may be arranged to have an outside diameter smaller than the outside diameter of the bearing housing 48. The vertical gap 502 can thereby be easily defined between the bushing 25 and the bearing support portion 31. Also, an inclined gap similar to the inclined gap 503 illustrated in FIG. 20 may be defined between the bearing housing 48 and the bushing 25.

The top face portion 21b of the rotor holder 210 illustrated in FIG. 17 may be modified to include a through hole extending in the axial direction therethrough as a channel to cool the stator 32. The same is true of each of the fans illustrated in FIGS. 18 to 20, 25, and 28 to 37. Although the impeller 12 illustrated in FIG. 1 is directly fixed to the outer circumferential surface of the bushing 25, the impeller 12 may be indirectly fixed thereto through one or more members. The same is true of each of FIGS. 16, 21, 26, 38, and 39. The impeller 12 illustrated in FIG. 17 may be fixed to the bushing 25 through two or more members. The same is true of each of FIGS. 18, 19, 20, 25, and 27. Also, the first through hole 128a illustrated in FIG. 27 may not necessarily be defined in the center of the top face portion 123.

Although each of the impellers 12 illustrated in FIGS. 28 to 37 is directly fixed to the rotor holder 210, the impeller 12 may be indirectly fixed thereto through one or more members. Each of the impellers 12 illustrated in FIGS. 28 to 34 may be directly fixed to the shaft 41 without the rotor holder 210 intervening therebetween. Each of the impellers 12 illustrated in FIGS. 28 to 34 may be indirectly fixed to the shaft 41 through a bushing.

In each of the bearing mechanisms 4 illustrated in FIGS. 3 and 14, the thrust dynamic pressure bearing portion may be defined only on an upper side of the thrust plate. In this case, as is the case with the bearing mechanism 4 illustrated in FIG. 21, an upward force is constantly applied to the shaft 41. A thrust dynamic pressure bearing portion arranged to produce a force that acts in a direction opposite to that of the force which lifts the impeller 12 can be easily defined by the thrust plate and the bearing portion 44.

An upper portion of the first radial dynamic pressure groove array 711 may be defined in the second inclined surface 441b independently of a remaining portion thereof. Also, no dynamic pressure grooves may be defined in the second inclined surface 441b of the bearing portion 44. Even in this case, provision of the second inclined surface 441b secures an area to support the shaft 41 so that bearing rigidity can be improved to a certain extent.

In each of the above-described preferred embodiments, each of the first and second radial dynamic pressure groove arrays 711 and 712 may be defined in the outer circumferential surface 411 of the shaft 41. Also, the thrust dynamic pressure groove arrays 721 and 722 may be defined in the upper surface and the lower surface, respectively, of the thrust plate 42. Also, the communicating hole 421a may not necessarily be provided in the bearing mechanism 4.

The outer circumferential surface 411 of the shaft 41 may be arranged to include a portion which has a decreased diameter in the vicinity of a top portion of the bearing portion 44 so that the seal portion may be defined between this portion and the inner circumferential surface 441 of the bearing portion 44. Also, a viscoseal that generates a fluid dynamic pressure through a dynamic pressure groove defined in the seal gap may be used as the seal portion.

A metallic member may be arranged, as the weight, in the balance correction portion 125 of the top face portion 123 of the impeller 12. Also, a through hole or a cut portion may be defined as the balance correction portion 125. The same is true of the balance correction portion 124a of the side wall portion 124. Also, the weight may be arranged on only one of the top face portion 123 and the lower end portion 124a of the side wall portion 124. Also, the unbalance of the rotating portion 2 may be eliminated by removing a portion of the top face portion 123 or a portion of the side wall portion 124.

In each of the above-described preferred embodiments, the magnetic center of the stator 32 and the magnetic center of the rotor magnet 22 may be arranged to coincide with each other in the axial direction when the motor 11 is stationary. An additional reduction in the vibrations of the motor 11 can thereby be achieved.

The motor 11 may be used as a motor of a fan of another type, such as a centrifugal fan. A fan in which the motor 11 is used is optimal for use with a device having a hard disk installed therein, such as a server. In the server, the fan is disposed at a position close to the hard disk. Therefore, if the fan is of a type which generates significant vibrations, read or write errors tend to easily occur in the hard disk. In contrast, read or write errors do not easily occur in the hard disk if the fan installed in the server uses the motor 11.

The present invention is, for example, applicable to fans arranged to generate air currents.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A dynamic pressure bearing apparatus comprising:
  a bearing portion, the bearing portion comprising:
    a sleeve made of a metallic sintered body, the sleeve having an inner circumferential surface, an outer circumferential surface and an upper surface; and
    a bearing housing comprising an annular upper portion and a circumferential body, the annular upper portion inwardly extended from the circumferential body, a lower surface of the annular upper portion covering the upper surface of the sleeve, and an inner surface of the circumferential body covering the outer circumferential surface of the sleeve,
  a shaft inserted in the bearing portion, and arranged to rotate about a central axis relative to the bearing portion, an outer circumferential surface of the shaft including an attachment surface to which an impeller is to be attached directly or through one or more members;
  a radial dynamic pressure bearing portion defined by an inner circumferential surface of the bearing portion, the outer circumferential surface of the shaft, and a portion of a lubricating oil which exists in a radial gap defined between the inner circumferential surface of the bearing portion and the outer circumferential surface of the shaft, and arranged to generate a fluid dynamic pressure in the portion of the lubricating oil;
  a seal gap defined by the outer circumferential surface of the shaft and an inner surface of the annular upper portion, the seal gap including a seal portion having a surface of the lubricating oil defined therein; and
  an annular member arranged in an annular shape, the annular member fixed to an upper surface of the annular upper portion such that the annular member is radially opposed to an outer circumferential surface of the shaft,
  a vertical gap extending in an axial direction, the vertical gap defined between the outer circumferential surface of the shaft and an inner circumferential surface of the annular member, the seal gap opposed to the vertical gap in the axial direction;
  a minimum radial width of the vertical gap is arranged to be smaller than a maximum radial width of an opening of the seal gap; and
  the seal gap is arranged to be in communication with an exterior space through the vertical gap.

2. The dynamic pressure bearing apparatus according to claim 1, wherein
  the bearing housing further comprises an annular projection portion arranged to project upward from the upper surface of the annular upper portion thereof;
  the annular member is fixed to the upper surface of the annular upper portion such that the annular member is located radially inward the annular projection portion; and
  at least a portion of an outer circumferential surface of the annular member is arranged to be in contact with an inner circumferential surface of the annular projection portion.

3. A fan comprising:
  a motor; and an impeller including a plurality of blades, and arranged to rotate about a central axis through the motor to produce air currents; wherein the motor includes:
    the dynamic pressure bearing apparatus of claim 1;
    a stationary portion including a stator; and
    a rotating portion including a rotor magnet arranged radially outside the stator.

4. The fan according to claim 3, wherein a lower end of the bearing portion is arranged at a level higher than that of a lower end of the impeller.

\* \* \* \* \*